US009465192B2

(12) United States Patent
Nakayama

(10) Patent No.: US 9,465,192 B2
(45) Date of Patent: Oct. 11, 2016

(54) IMAGING OPTICAL SYSTEM, CAMERA DEVICE AND MOBILE INFORMATION TERMINAL DEVICE

(71) Applicant: Takahiro Nakayama, Yokohama (JP)

(72) Inventor: Takahiro Nakayama, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 63 days.

(21) Appl. No.: 14/138,339

(22) Filed: Dec. 23, 2013

(65) Prior Publication Data

US 2014/0184845 A1 Jul. 3, 2014

(30) Foreign Application Priority Data

Dec. 27, 2012 (JP) ................................. 2012-285931

(51) Int. Cl.
*G02B 9/60* (2006.01)
*G02B 13/04* (2006.01)

(52) U.S. Cl.
CPC ................. *G02B 9/60* (2013.01); *G02B 13/04* (2013.01)

(58) Field of Classification Search
CPC G02B 13/0045; G02B 13/04; G02B 13/005; G02B 13/006; G02B 9/60; G02B 9/62
USPC ......... 359/713–714, 755–756, 761–763, 770
See application file for complete search history.

(56) References Cited

U.S. PATENT DOCUMENTS

| 5,805,359 | A | 9/1998 | Yamanashi | |
|---|---|---|---|---|
| 7,907,352 | B2 * | 3/2011 | Miyano | ......................... 359/754 |
| 2001/0024332 | A1 * | 9/2001 | Mori | .............................. 359/755 |
| 2006/0007561 | A1 | 1/2006 | Suzuki | |
| 2010/0027254 | A1 | 2/2010 | Nakayama | |
| 2010/0296180 | A1 | 11/2010 | Sudoh et al. | |
| 2011/0051260 | A1 | 3/2011 | Nakayama et al. | |
| 2011/0141578 | A1 | 6/2011 | Nakayama | |
| 2011/0310496 | A1 * | 12/2011 | Kubota et al. | ................ 359/794 |
| 2011/0317285 | A1 | 12/2011 | Ohashi et al. | |
| 2013/0194681 | A1 | 8/2013 | Ohashi et al. | |

(Continued)

FOREIGN PATENT DOCUMENTS

| CN | 103676093 A | 3/2014 |
|---|---|---|
| EP | 2 397 880 A2 | 12/2011 |
| EP | 2 400 334 A2 | 12/2011 |

(Continued)

OTHER PUBLICATIONS

Extended European Search Report issued Apr. 4, 2014, in European Patent Application No. 13199442.8.

(Continued)

*Primary Examiner* — Jordan Schwartz
(74) *Attorney, Agent, or Firm* — Oblon, McClelland, Maier & Neustadt, L.L.P.

(57) ABSTRACT

An imaging optical system, includes: in the order from an object side to an image plane side, a first lens group having a first lens which is formed as a negative lens; a second lens group having a second lens which is formed as a plano-concave lens, a third lens which is formed as a negative meniscus lens, and a fourth lens which is formed as a biconvex lens; an aperture stop; a third lens group having a fifth lens which is formed as a biconvex lens, and a sixth lens which is formed as a biconcave lens; and a fourth lens group having a seventh lens which is formed as a negative meniscus lens.

10 Claims, 14 Drawing Sheets

(56) References Cited

U.S. PATENT DOCUMENTS

2013/0215321 A1    8/2013  Nakayama
2014/0078605 A1*   3/2014  Ohashi .................... 359/754

FOREIGN PATENT DOCUMENTS

| | | |
|---|---|---|
| EP | 2 708 930 A1 | 3/2014 |
| JP | 8-313802 | 11/1996 |
| JP | 11-326756 | 11/1999 |
| JP | 2005-352060 | 12/2005 |
| JP | 2012-008347 | 1/2012 |

OTHER PUBLICATIONS

Office Action issued in Chinese Patent Application No. 201310739121.3 on Sep. 1, 2015 (w/ English translation).

* cited by examiner

IMAGING OPTICAL SYSTEM, CAMERA DEVICE AND MOBILE INFORMATION TERMINAL DEVICE

CROSS-REFERENCE TO RELATED APPLICATION

The present application is based on and claims priority from Japanese Patent Application Number 2012-285931 filed on Dec. 27, 2012, the disclosure of which is hereby incorporated by reference herein in its entirety.

BACKGROUND

The present invention relates to an improvement of an imaging optical system of a single focus for imaging a photographic subject image in various types of cameras including a so-called silver halide camera, particularly a digital camera, a digital video camera and the like, and particularly, to an imaging optical system in an imaging device using an electronic imaging unit, such as a digital camera or a digital video camera, a camera device using such an imaging optical system, and a mobile information terminal device having such an imaging function.

A market for a so-called digital camera for obtaining digital image data of a photographic subject using a solid-state image sensor has been remarkably large. User's demands for digital cameras of this kind and the like are widely ranged. Among them, users have a high expectation of the category of a high-quality compact camera which uses a relatively large imaging element a diagonal length of which is approximately 20 mm to 45 mm, and on which an imaging lens made up of a high-performance single-focus optical system is installed. The user, among the demands, imposes higher weight on factors of high performance, and in addition thereto, a small F number, that is, being excellent in portability while having a large aperture, that is, a compact size and a light weight.

Here, in terms of high performance, the compact camera is required to have resolving power corresponding to an imaging element of at least 10 mega pixels to 20 mega pixels, in addition thereto, less coma flare, high contrast, and no point image distortion in a peripheral part of a field angle at an open aperture, less chromatic aberration and no occurrence of unnecessary coloring in a part having a large brightness difference, less distortion aberration, and capability of drawing a straight line as a straight line, and so on.

Further, the compact camera is, in terms of a large aperture, required to have an F number which is approximately at least F2.8 from a viewpoint of the necessity of enhancing the differentiation from a general compact camera on which a zoom lens is mounted.

In terms of downsizing, it is required to control both an entire optical length and a diameter of the lens to be small. Further, in terms of downsizing at non-photographing, it is required to have a mechanism called a retractable type in which an air gap on an optical axis in a photographing optical system, such as before and after a diaphragm or a back focal length at non-photographing is shortened to shorten the entire lens length.

Since many users hope that a field angle of a photographing lens has a wide viewing angle to some extent, it is preferable to have a 76-degree field angle equivalent to 28 mm of a focal distance in 35 mm-silver halide camera (so-called Leica size) conversion or a more-degree field angle, that is, 38 or more degrees of a half field angle.

In regard to imaging lenses for digital cameras of this kind, there are considered many kinds of imaging lenses, but an example of the configuration representative of a single focus lens having a wide viewing angle may include a so-called retrofocus type in which a lens group of negative refracting power is disposed on an object side and a lens group of positive refracting power is disposed on an image plane side. The primary reason the retrofocus type is adopted is that there exists a demand for setting an exit pupil position at a distance from an image plane and making peripheral light flux incident at an angle nearly vertical to a sensor, based upon characteristics of an area sensor having a color filter and a microlens for each pixel. However, as understood from a point that the retrofocus type optical system has the purpose of ensuring a back focal length for using a wide-angle lens as an interchangeable lens of a single-lens reflex camera, an entire lens length (distance from a surface on a most object side to an image plane) tends to be long.

On the other hand, in a relatively large imaging element a diagonal length of which is approximately 20 mm to 45 mm, because of improvement or optimization of an on-chip microlens, advancement in image processing or the like in recent years, there occurs no big problem even if the peripheral optical flux is rather obliquely incident to the sensor. Specifically, even if an angle between a main beam and an optical axis at the maximum image height is approximately 35 degrees to 40 degrees, it is becoming possible to establish a sufficiently allowable system. In consequence, it is possible to select a lens type more suitable for downsizing without relying on vertical incidence of the peripheral optical flux as much as before. Under these circumstances, an example of the optical system of the lens type more suitable for downsizing than the retrofocus type optical system may include an approximately symmetrical type optical system or a telephoto type optical system in which a lens group of negative refracting power is disposed on an image plane side. Examples of the conventional imaging lens of such a lens type are disclosed in Japanese Patent Application Publication Numbers H08-313802, H11-326756, 2005-352060, and the like. Further, an example of the lens in which the feature of the retrofocus type remains is disclosed in Japanese Patent Application Publication No. 2012-008347.

The imaging optical system disclosed in Japanese Patent Application Publication No. H08-313802 is an approximately symmetrical type of wide-angle lens, and is provided with a sufficiently large aperture, but there still remains a problem with downsizing since an entire lens length (distance from a surface on a most object side of a lens system to an image plane) or a total lens thickness (distance from the surface on the most object side of the lens system to a surface on a most image side of the lens system) is large. The imaging optical system disclosed in Japanese Patent Application Publication No. H11-326756 also has the configuration close to a symmetrical type where a half field angle exceeds 50 degrees to establish a wide viewing angle, but has a large F number of F4 to F4.5, and has a purpose different from that of the present invention. The imaging optical system disclosed in Japanese Patent Application Publication No. 2005-352060 is configured such that the entire lens length and the total lens thickness are small, but because of a short back focal length, a diameter of a lens close to an image plane is large. Therefore, it cannot be said that this imaging optical system is also sufficiently small-sized. The imaging optical system disclosed in Japanese Patent Application Publication No. 2012-008347 is improved on a point of a field angle, F number and imaging performance, but has the configuration in which the feature of the retrofocus type clearly remains, and still has the problem with downsizing.

SUMMARY

An object of the present invention is to provide an imaging optical system that is sufficiently small-sized and light in weight, while having high performance, a wide angle of an approximately 76-degree field angle, and a large aperture of approximately F2.8.

In order to achieve the above object, an embodiment of the present invention provides: an imaging optical system, comprising: in the order from an object side to an image plane side, a first lens group having negative refracting power that includes a negative lens having a concave surface on the image plane side; a second lens group having positive refracting power that includes, in the order from the object side to the image plane side, a negative lens having a concave surface on the object side, and a cemented lens of a negative lens and a positive lens having a convex surface on the object side; an aperture stop; a third lens group having positive refracting power that includes a cemented lens of a positive lens and a negative lens; and a fourth lens group having negative refracting power that includes a negative lens having a concave surface on the object side, wherein the imaging optical system is configured to satisfy the following conditional expression (1):

$$0.60 < IY/AP < 0.85 \quad (1)$$

where a maximum image height of the imaging optical system is IY, and a distance on an optical axis from an image plane to an exit pupil position of the imaging optical system is AP.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
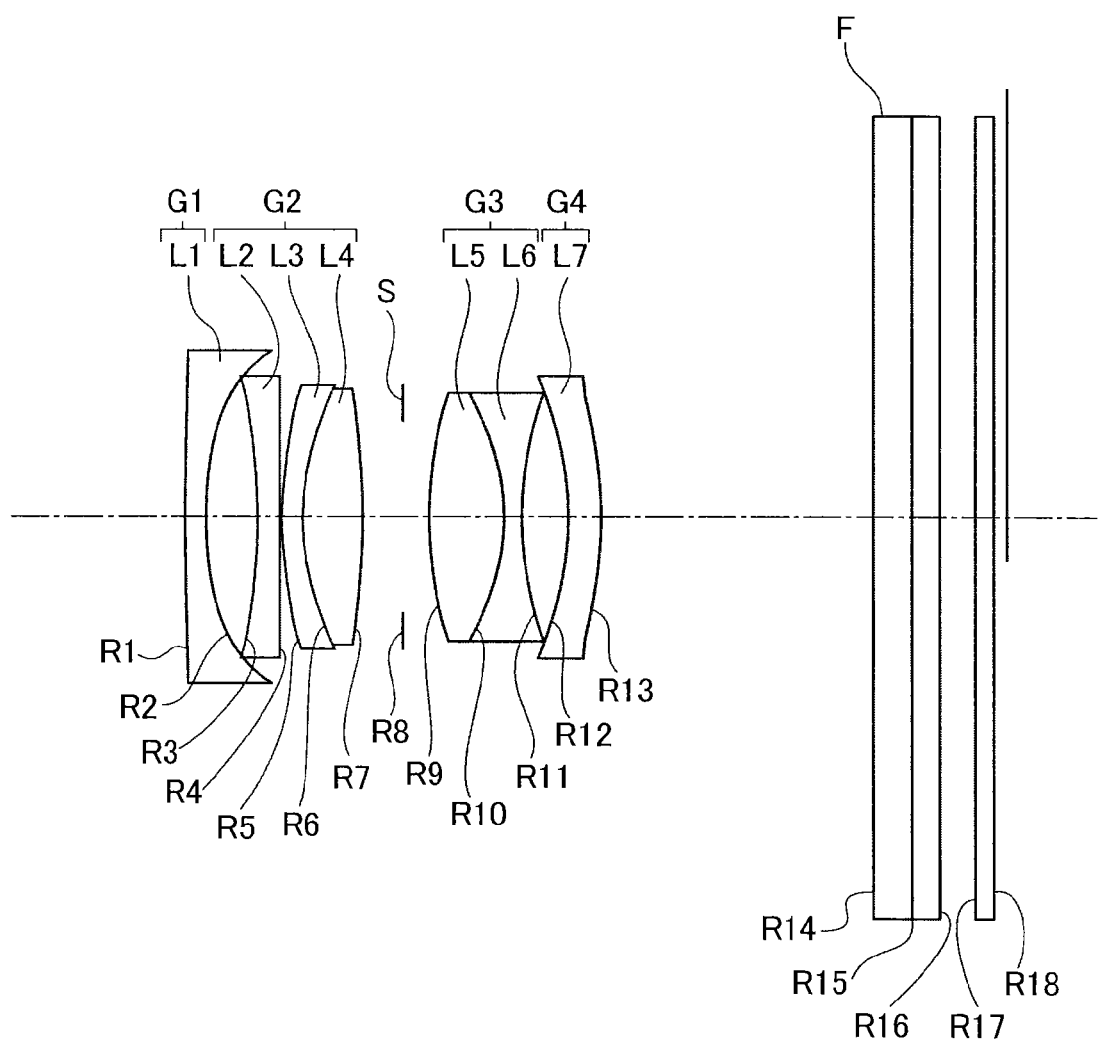
FIG. 1 is a longitudinal cross section along an optical axis showing a section configuration of an imaging optical system in accordance with Example 1 according to First embodiment of the present invention.

Selected embodiments of the present invention will be explained with reference to the drawings. It will be apparent to those skilled in the art from this disclosure that the following description of the embodiments of the present invention are provided for illustration only, and not for the purpose of limiting the invention as defined by the appended claims and their equivalents.

Hereinafter, with reference to the accompanying drawings, an imaging optical system, a camera device and a mobile information terminal device according to the present invention will be in detail explained based upon First to Sixth embodiments of the present invention. First, principled embodiments of the present invention will be explained before explaining examples with specific numerical values.

First embodiment of the present invention relates to an embodiment of an imaging optical system for imaging an optical image of an object, and Second to Sixth embodiments are also similar to First embodiment.

An imaging lens, which is a single-focus imaging lens for imaging a photographic subject image, as an imaging optical system according to the first embodiment of the present invention is constituted of a plurality of lenses, has a wide angle of an approximately 38-degree half field angle, and a large aperture of approximately F2.8, is sufficiently small-sized and light in weight, and can obtain very excellent image performance by sufficiently lowering various aberrations.

At present, as to digital cameras, there have been greatly increased needs for high picture quality, downsizing, a wide angle, and a large aperture, and it is required to proceed with the development for meeting these needs. In general, with advancement of the wide angle, coma aberration, astigmatism, curvature of field, and particularly distortion aberration tend to increase, and with advancement of the large aperture, coma aberration and the like, and particularly spherical aberration increase. The optical system tends to be large-sized for correcting these aberrations.

The present invention is made based upon the findings that adoption of the following configuration enables the problems with these aberrations and the large sizing of the optical system to be solved.

An imaging optical system according to an embodiment of the present invention, in the order from an object side to an image plane side, includes a first lens group having negative refracting power, a second lens group having positive refracting power, an aperture stop, a third lens group having positive refracting power, and a fourth lens group having negative refracting power. The first lens group is constituted of a negative lens having a concave surface on the image plane side, the second lens group is constituted of, in the order from the object side to the image plane side, a negative lens having a concave surface on the object side, a cemented lens of a negative lens and a positive lens having a convex surface on the object side, the third lens group is constituted of a cemented lens of a positive lens and a negative lens, and the fourth lens group is constituted of a negative lens having a concave surface on the object side.

The imaging optical system is configured to satisfy the following conditional expression (1):

$$0.60 < IY/AP < 0.85 \quad (1)$$

where the maximum image height of the imaging optical system is IY, and a distance on an optical axis from the image plane to an exit pupil position of the imaging optical system is AP.

First, the imaging optical system according to an embodiment of the present invention is configured such that the first lens group having the negative refracting power is disposed on a most object side, the fourth lens group having the negative refracting power is disposed on a most image plane side, the aperture stop is disposed in between, and each of the second lens group and the third lens group which are disposed across the aperture stop from each other has the positive refracting power. This structure causes, though not so much exactly, symmetry to the refracting power arrangement, thereby lowering the difficulty level of correcting coma aberration, chromatic aberration of magnification, and distortion aberration.

Further, a surface on the image plane side of the first lens group and a surface on the object side of the fourth lens group are opposed to each other to be respectively formed in a concave shape, thereby making it possible to correct the above-mentioned aberrations in a higher level. In addition, a surface on the image plane side of a forefront negative lens of the first lens group is formed in a concave shape, which has the effect particularly also for correction of the spherical aberration increasing with the large aperture. At least one set of a combination of the positive lens and the negative lens is arranged to each of the second lens group and the third lens group each having the positive refracting power, thus providing the effect of correcting axial chromatic aberration and a color difference of the coma aberration.

In addition, positive-and-negative cemented lenses are each arranged across the aperture stop, thereby enabling an effective correction of the axial chromatic aberration while keeping the symmetry of the refracting power arrangement to some extent. Since the cemented lens is an lens element that is positioned near the aperture stop and largely performs the correction of the spherical aberration, image performance degradation due to manufacturing errors tends to occur, but it is possible to restrict the image performance degradation to be small to some extent by reducing the manufacturing errors as the cemented lens. The negative lens having the concave surface on the object side of the second lens group, and the negative lens of the third lens group are provided, thus creating the effect of appropriately correcting particularly the coma aberration while keeping symmetry of aberration correction.

Further, a pair of the concave surface on the image plane side of the negative lens of the first lens group and the convex surface on the object side of the positive lens of the second lens group, and a pair of the convex surface on the image plane side of the positive lens of the third lens group and the concave surface on the object side of the negative lens of the fourth lens group respectively correct the spherical aberration. It is thus restricted to perform spherical aberration correction across the aperture stop, providing the effect of restricting the performance degradation due to the manufacturing errors.

The above-mentioned conditional expression (1) defines an appropriate range of the exit pupil distance, in which the effect of the aberration correction can be sufficiently achieved with the configuration of the above-mentioned optical system, to the image height of the imaging optical system. When a value of IY/AP of the conditional expression (1) exceeds an upper limit value, the optical system approaches the telephoto type, and when the value of IY/AP of the conditional expression (1) is below a lower limit value, the optical system approaches the retrofocus type. Therefore, in any case, the symmetry of the refracting power is largely broken, which particularly increases the correction difficulty level on the aberrations of the coma aberration, the distortion aberration and the like that have increased by the wide angle.

According to the above-mentioned configuration of the imaging optical system, it is possible to obtain the large effect on the aberration correction as explained above, and even under the strict condition of the wide angle of the approximately 38-degree half field angle and the large aperture of the approximately F2.8, it is possible to configure a small-sized optical system with high image performance.

It should be noted that, for achieving more favorable performance, the imaging optical system may be configured to satisfy the following conditional expression (2):

$$1.00 < AP/TL < 1.40 \quad (2)$$

where the distance on the optical axis from the image plane to the exit pupil position of the imaging optical system is AP, and a distance on an optical axis from a forefront surface of the first lens group to a backmost surface of the fourth lens group when focusing on infinity is TL.

The conditional expression (2) defines an appropriate range of an entire lens length of the exit pupil distance. When a value of AP/TL of the conditional expression (2) is below a lower limit value, the first lens group is excessively away from the aperture stop to largely increase a size of the first lens group in a radial direction, or the first lens group causes strong negative power to largely break the symmetry of the refracting power arrangement in the entire optical system. Therefore, particularly the difficulty level of the correction to the coma aberration, the chromatic aberration of magnification, the distortion aberration and the like increases, and for correcting it, the entire optical system is possibly lengthened.

When the value of AP/TL of the conditional expression (2) exceeds an upper limit value, the aberration in the first lens group is excessively generated to increase the image performance degradation due to manufacturing errors or just the same, the symmetry of the refracting power arrangement in the entire optical system is largely broken to possibly generate the defect as similar to a case where the value of AP/TL of the conditional expression (2) is below the lower limit value. In addition, the fourth lens group is excessively away from the aperture stop to be possibly enlarged in the radial direction. For achieving the higher performance, an air lens formed between a backmost surface of the second lens group and a forefront surface of the third lens group may have the positive refracting power.

With this configuration, balance of the Petzval sum is easily maintained to lower the difficulty level of control of the curvature of field, providing the effect of ensuring flatness of image plane performance. The convex shape of the lens exists in a shutter space to enhance the use efficiency of the space, providing the effect of downsizing the optical system.

For achieving higher performance, the imaging optical system may be configured to satisfy the following conditional expression (3):

$$0.50 < f12/f34 < 1.60 \tag{3}$$

where a combined focal distance of the first lens group and the second lens group is f12, and a combined focal distance of the third lens group and the fourth lens group is f34.

The conditional expression (3) defines an appropriate range of the combined focal distance of the third lens group and the fourth lens group to the combined focal distance of the first lens group and the second lens group. When a value of f12/f34 of the conditional expression (3) is either below a lower limit value or above an upper limit value, the symmetry of the refracting power arrangement in the optical system is largely broken, and, particularly the difficulty level of the correction of the coma aberration, the chromatic aberration of magnification, the distortion aberration and the like increases, and for correcting it, the entire optical system is possibly lengthened.

It should be noted that for achieving more favorable performance, it is preferable that the imaging optical system be configured to satisfy the following conditional expression (3A):

$$0.60 < f12/f34 < 1.45 \tag{3A}$$

For achieving higher performance, the imaging optical system may have at least one or more aspheric surfaces in the fourth lens group, and may be configured to satisfy the following conditional expression (4):

$$0 < f/|f4| < 0.30 \tag{4}$$

where a focal distance of an entire system is f, and a focal distance of the fourth lens group is f4.

The conditional expression (4) defines an appropriate range of the focal distance of the fourth lens group to the focal distance of the entire system. The fourth lens group in the present optical system performs control of the exit pupil position and control of a light beam incident angle as main functions. Providing at least one or more aspheric surfaces in the fourth lens group enables the light beam incident angle to each image height in the image plane to be more effectively controlled. When a value of f/|f4| of the conditional expression (4) exceeds an upper limit value, the refracting power of the fourth lens group becomes excessively large, and there is a possibility that it is difficult to perform both of the exit pupil position control and the light beam angle control. There is no possibility that the value of f/|f4| of the conditional expression (4) is below a lower limit value.

It should be noted that, for achieving more favorable performance, it is preferable that the image optical system be configured to satisfy the following conditional expression (4A):

$$0 < f/|f4| < 0.20 \tag{4A}$$

For achieving higher performance, the imaging optical system may be configured to satisfy the following conditional expression (5):

$$0.70 < TL/f < 1.10 \tag{5}$$

where the focal distance of the entire system is f, and the distance on the optical axis from the forefront surface of the first lens group to the backmost surface of the fourth lens group when focusing on infinity is TL.

The conditional expression (5) defines an appropriate range of an entire lens length, in which the effect of the present invention is achieved at the maximum, to the focal distance.

For achieving higher performance, the imaging optical system may be configured to satisfy the following conditional expression (6):

$$1.00 < |AP/Rg41| < 2.50 \tag{6}$$

where the distance on the optical axis from the image plane to the exit pupil position of the imaging optical system is AP, and a curvature radius of a forefront surface of the fourth lens group is Rg41.

The conditional expression (6) defines an appropriate range of the curvature radius of the forefront surface of the fourth lens group to the exit pupil distance. When a value of |AP/Rg41| of the conditional expression (6) is below a lower limit value, the refracting power of a surface on the image plane side the fourth lens group is excessively large, and when the value of |AP/Rg41| of the conditional expression (6) exceeds an upper limit value, the refracting power of a surface on the object side of the fourth lens group is excessively large. Therefore, primarily the correction of the coma aberration becomes insufficient, and there is a possibility that a manufacturing error sensitivity of the fourth lens group increases. In addition, when the value of |AP/Rg41| of the conditional expression (6) is below the lower limit value, an edge thickness of the fourth lens group increases. When a substantial thickness of the entire optical system increases, and the value of |AP/Rg41| of the conditional expression (6) exceeds the upper limit value, an air gap between the backmost surface of the third lens group and the forefront surface of the fourth lens group is expanded to increase a length on the optical axis of the optical system, creating a possibility that a camera thickness in a case where the optical system is collapsed in the camera body increases.

It should be noted that, for achieving more favorable performance, it is preferable that the imaging optical system be configured to satisfy the following conditional expression (6A):

$$1.20 < |AP/Rg41| < 2.10 \tag{6A}$$

It should be noted that it is desirable that the imaging optical system according to an embodiment of the present invention is configured as a single-focus lens, and focusing may be performed by moving the entire imaging optical system.

Seventh embodiment of the present invention relates to a camera device configured by using the imaging optical system according to the above-mentioned embodiment (including the later-described First to Sixth embodiments) of the present invention.

That is, an imaging optical system in the camera device such as a so-called digital camera is constituted of the above-mentioned imaging optical system, and a high image quality compact camera device may adopt the imaging optical system including a high-performance imaging lens that has a wide angle of a 38-degree half field angle and a large aperture of F2.8, but is sufficiently small-sized in terms of an entire lens length, a total lens thickness and a lens diameter, ensures extremely excellent image performance by sufficiently lowering various aberrations, and has resolving power corresponding to the imaging element of 10 mega pixels to 20 mega pixels.

The camera device may include a function of converting a photographic image into digital information.

In addition, an imaging optical system in an information device such as a mobile information terminal device having an imaging function, or the like may be constituted of the above-mentioned imaging optical system to provide a high image quality compact mobile information terminal device that likewise adopts a high quality compact imaging optical system as an imaging optical system of an imaging function part.

EXAMPLES

Specific examples will be in detail explained based upon the above-mentioned embodiment of the present invention. Example 1, Example 2, Example, 3, Example 4, Example 5, and Example 6 that will be hereinafter explained correspond to examples by specific numerical values of imaging optical systems according to First embodiment, Second embodiment, Third embodiment, Fourth embodiment, Fifth embodiment, and Sixth embodiment, respectively.

Further, Seventh embodiment is an embodiment of a camera device or a mobile information terminal device using an imaging optical system that will be shown in each of Examples 1 to 6 as an imaging lens.

Figure 2:
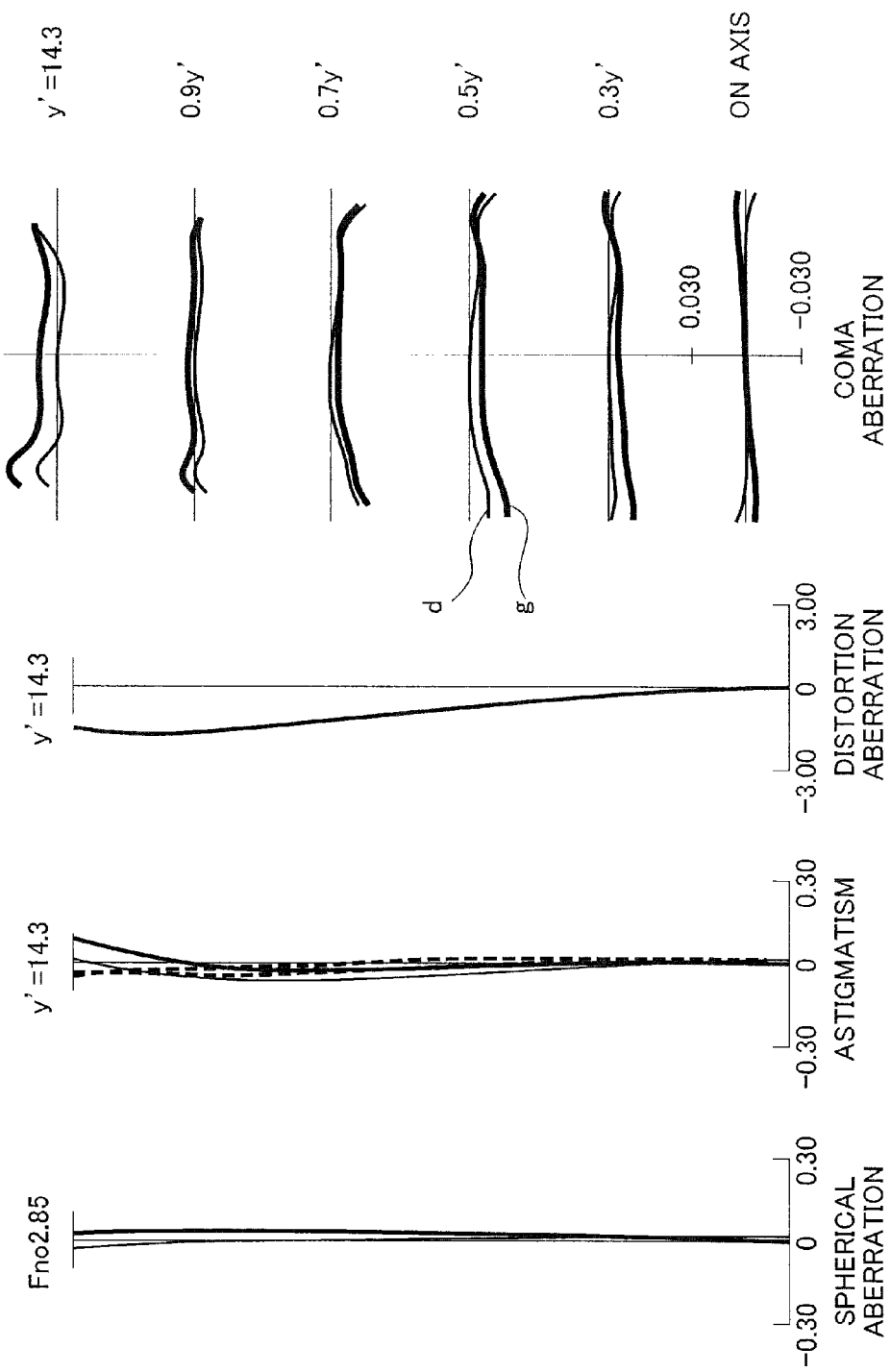
FIG. 2 is aberration curve diagrams showing aberrations of spherical aberration, astigmatism, distortion aberration and coma aberration in regard to a d line and a g line in the imaging optical system according to Example 1 of the present invention shown in FIG. 1.
Figure 3:
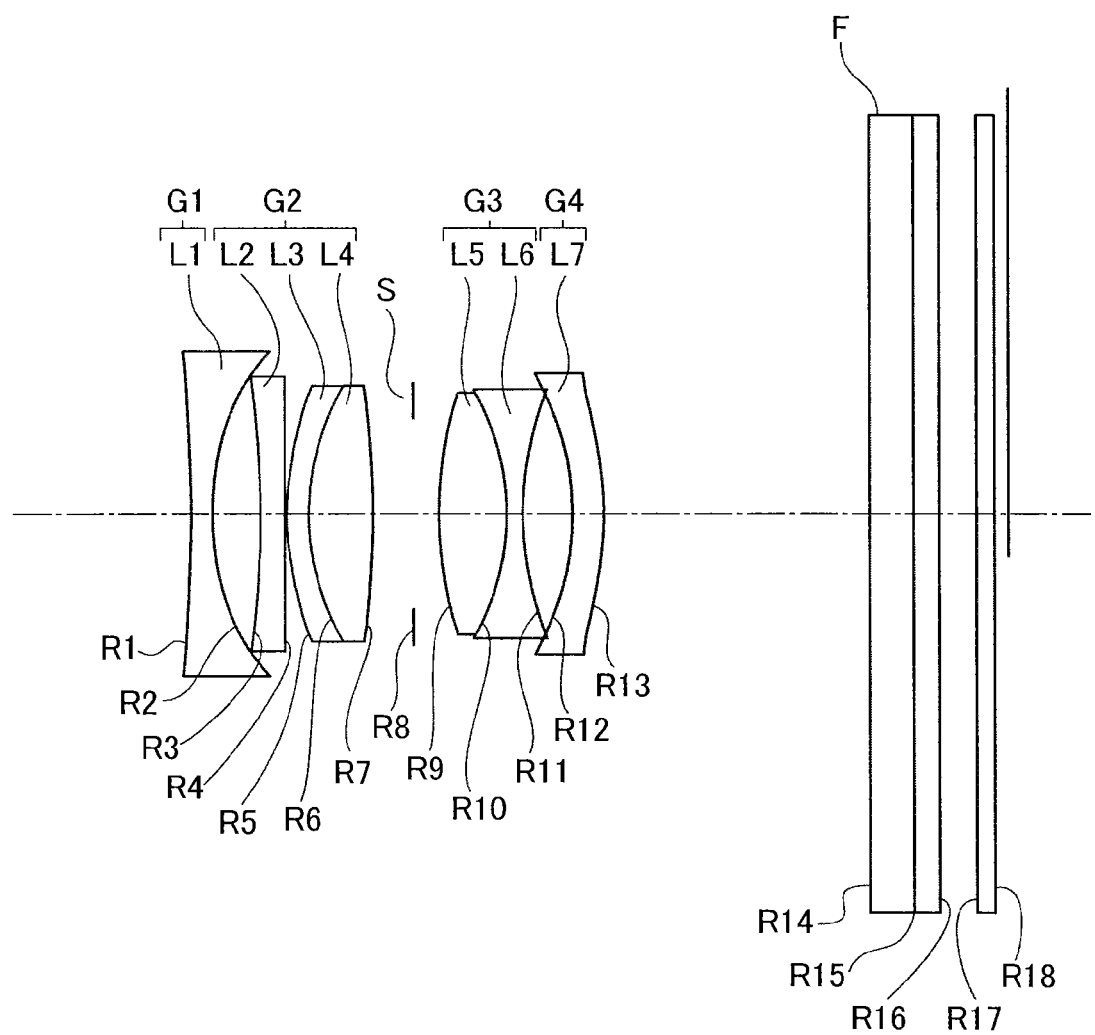
FIG. 3 is a longitudinal cross section along an optical axis showing a section configuration of an imaging optical system in accordance with Example 2 according to Second embodiment of the present invention.
Figure 4:
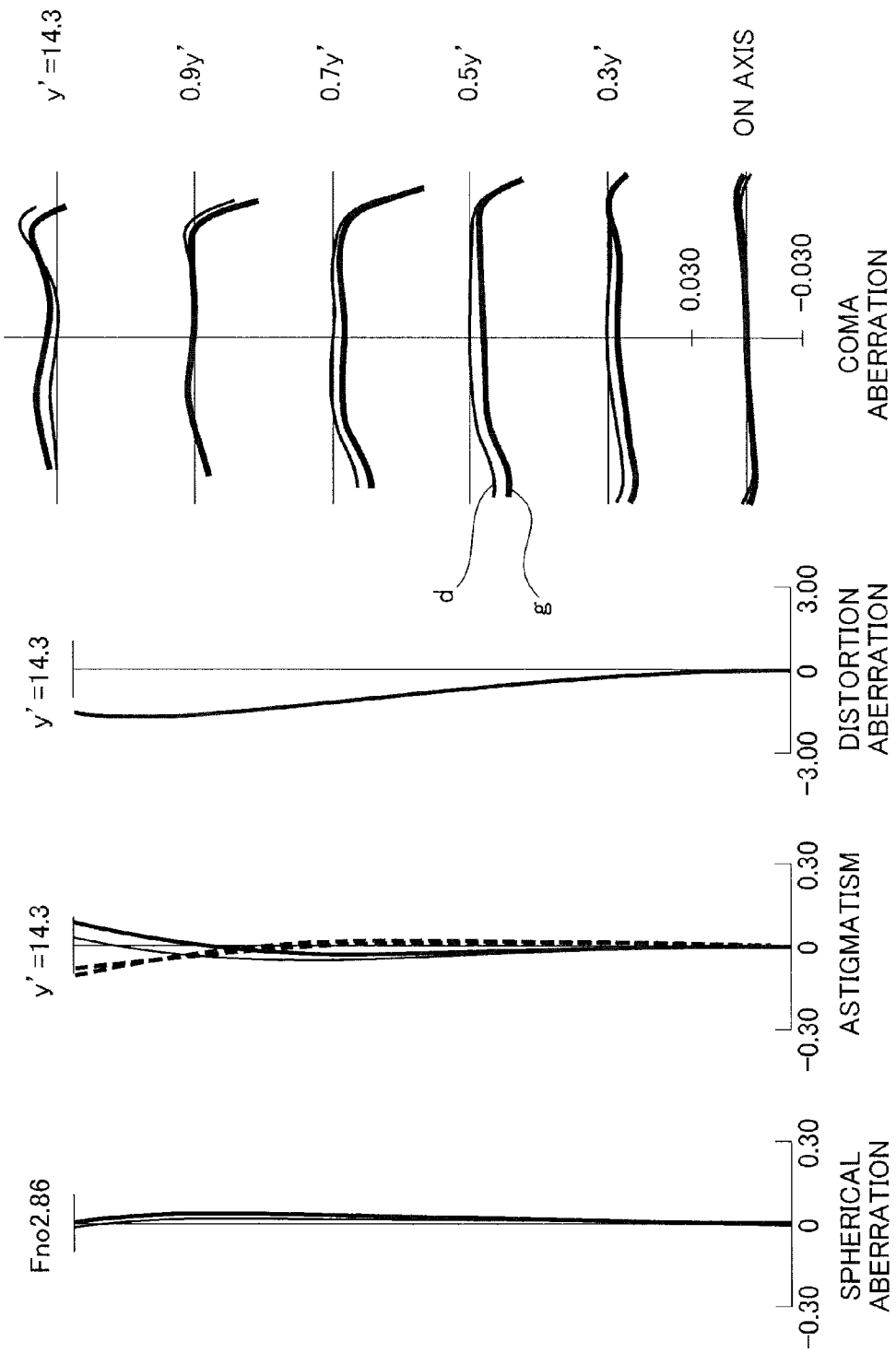
FIG. 4 is aberration curve diagrams showing aberrations of spherical aberration, astigmatism, distortion aberration and coma aberration in regard to a d line and a g line in the imaging optical system according to Example 2 of the present invention shown in FIG. 3.
Figure 5:
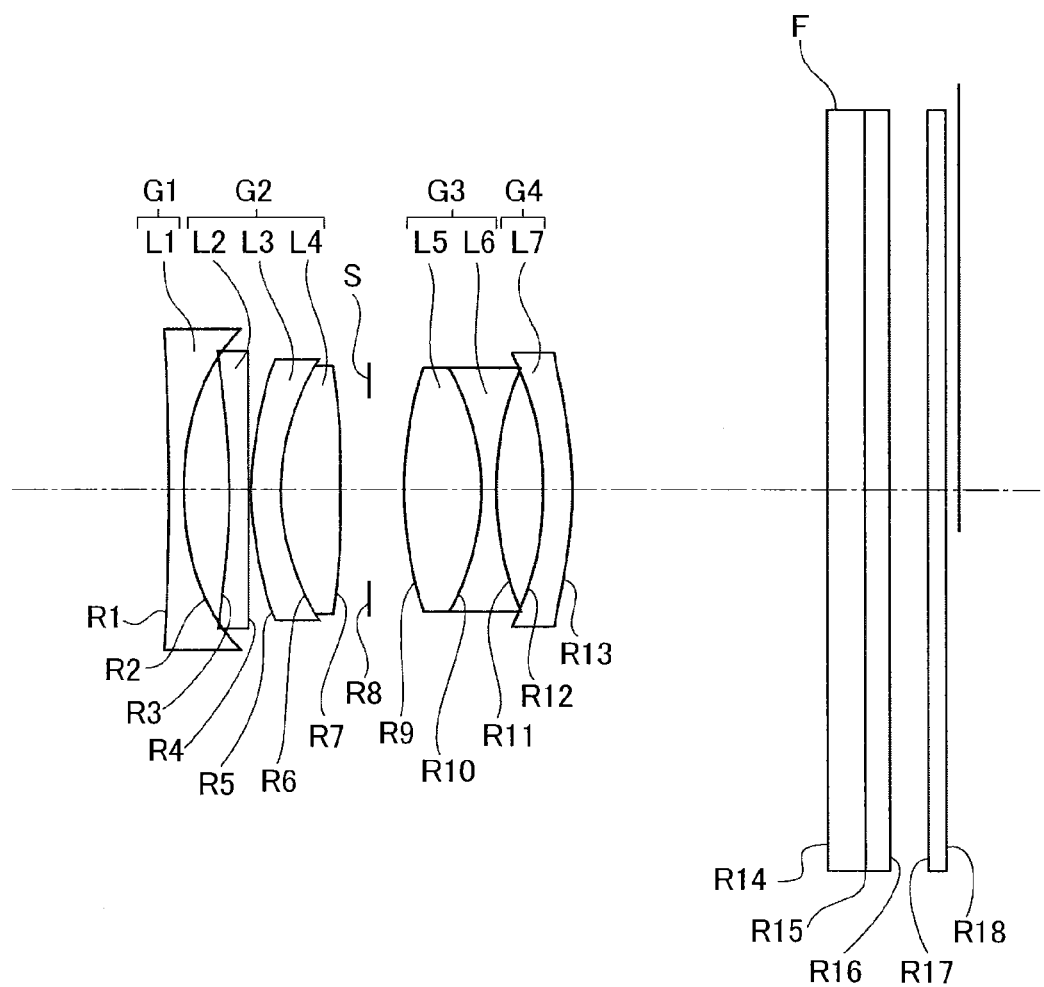
FIG. 5 is a longitudinal cross section along an optical axis showing a section configuration of an imaging optical system in accordance with Example 3 according to Third embodiment of the present invention.
Figure 6:
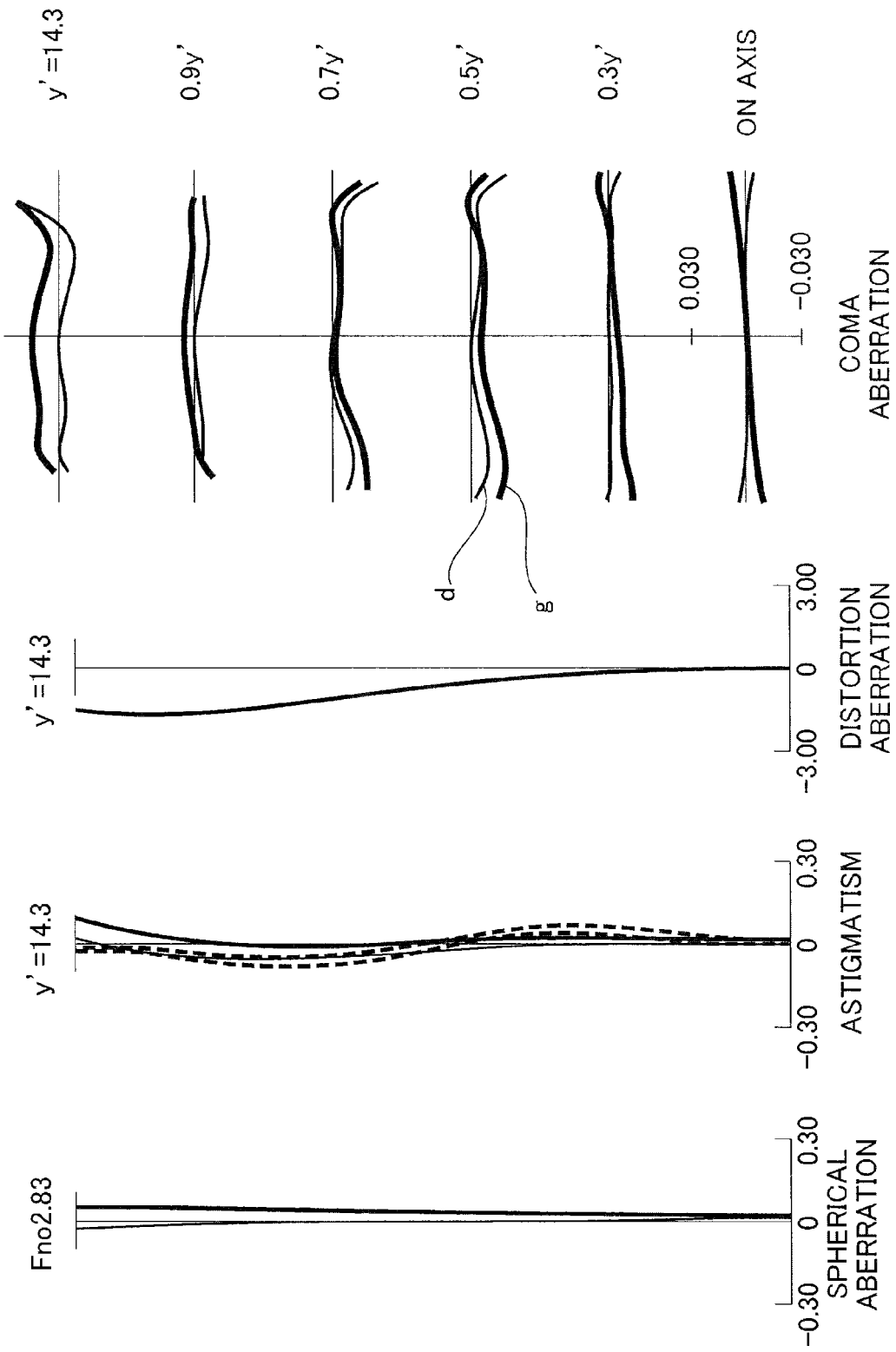
FIG. 6 is aberration curve diagrams showing aberrations of spherical aberration, astigmatism, distortion aberration and coma aberration in regard to a d line and a g line in the imaging optical system according to Example 3 of the present invention shown in FIG. 5.
Figure 7:
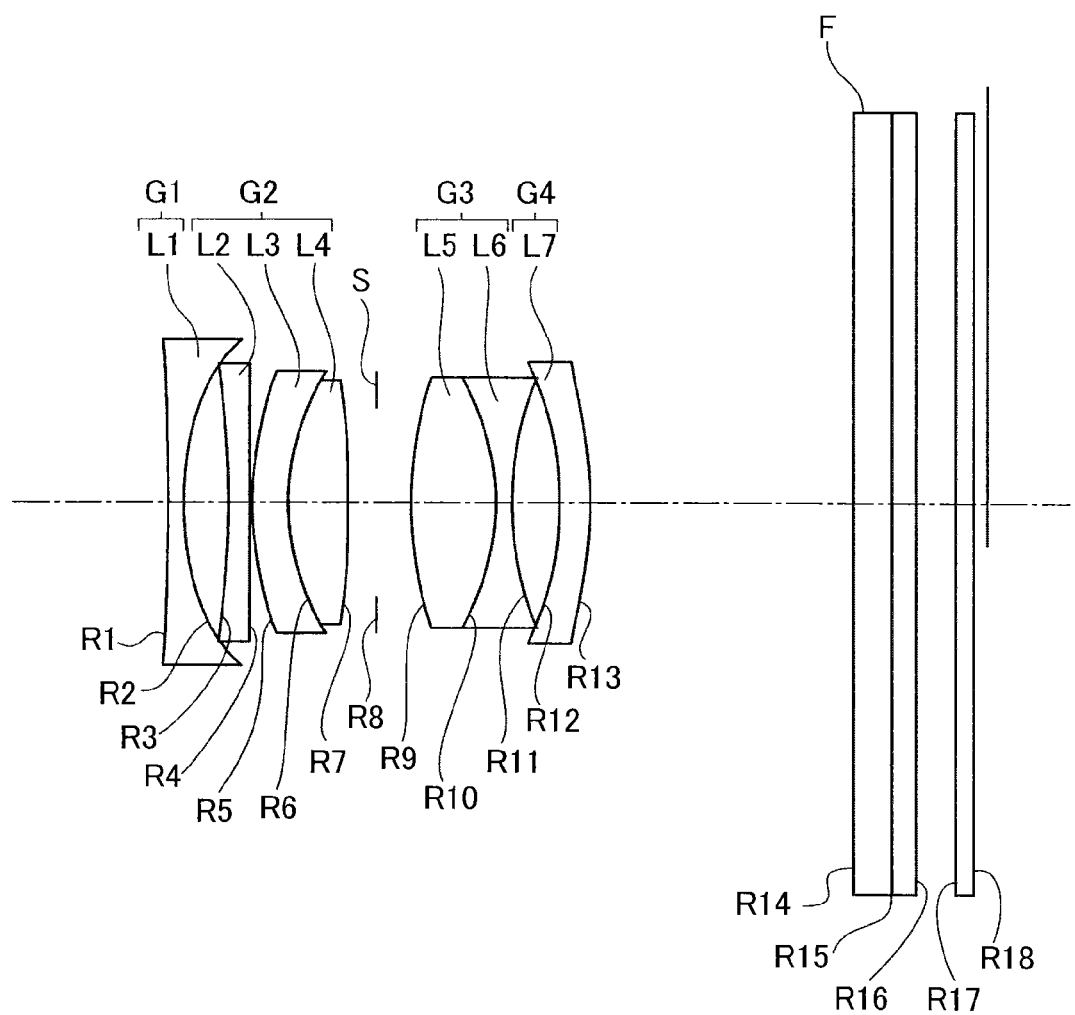
FIG. 7 is a longitudinal cross section along an optical axis showing a section configuration of an imaging optical system in accordance with Example 4 according to Fourth embodiment of the present invention.
Figure 8:
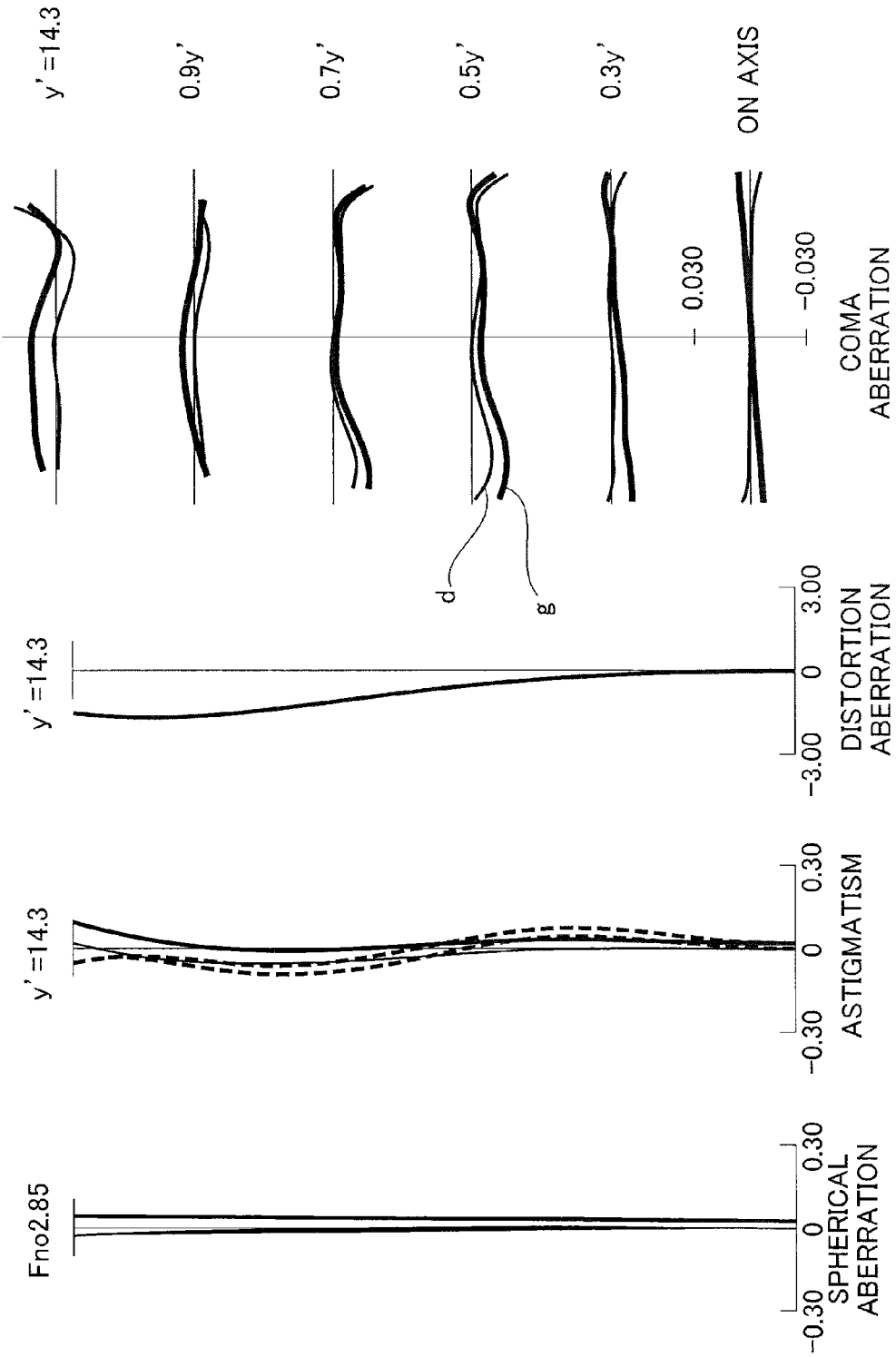
FIG. 8 is aberration curve diagrams showing aberrations of spherical aberration, astigmatism, distortion aberration and coma aberration in regard to a d line and a g line in the imaging optical system according to Example 4 of the present invention shown in FIG. 7.
Figure 9:
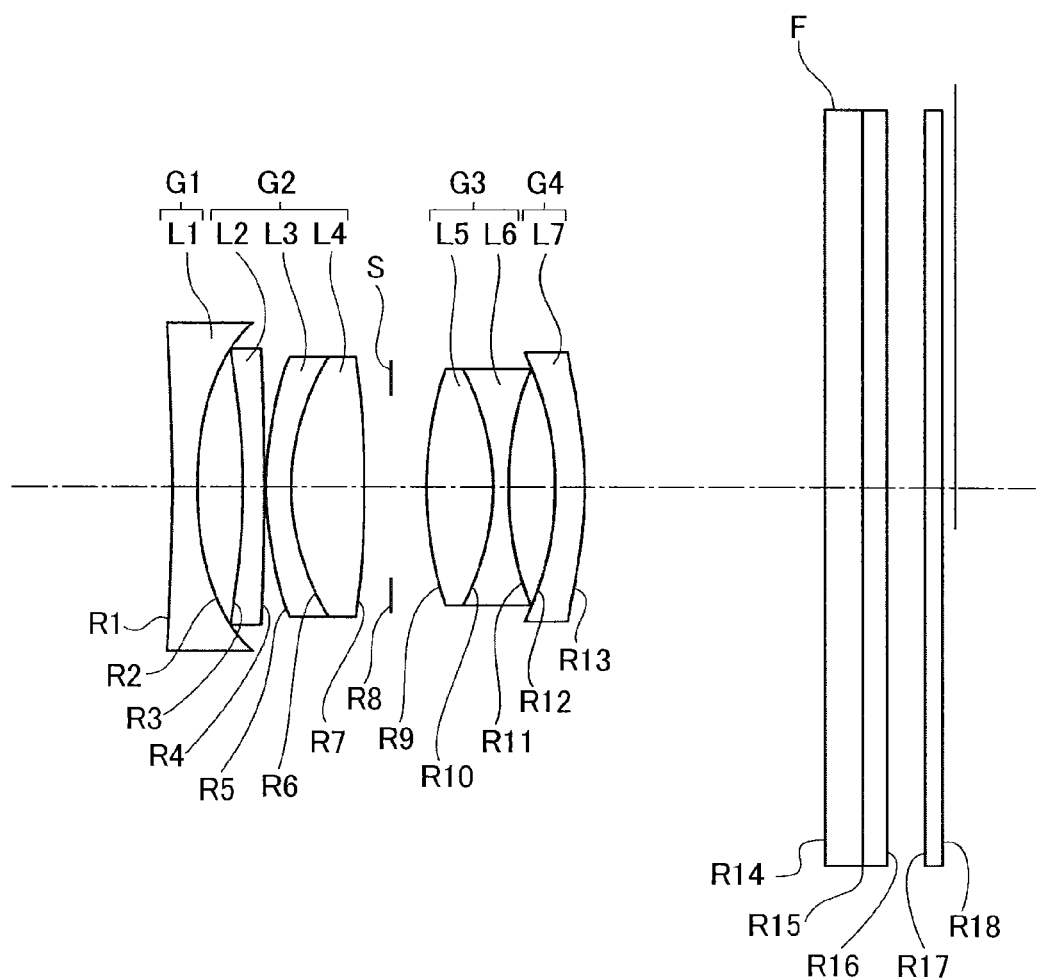
FIG. 9 is a longitudinal cross section along an optical axis showing a section configuration of an imaging optical system in accordance with Example 5 according to Fifth embodiment of the present invention.
Figure 10:
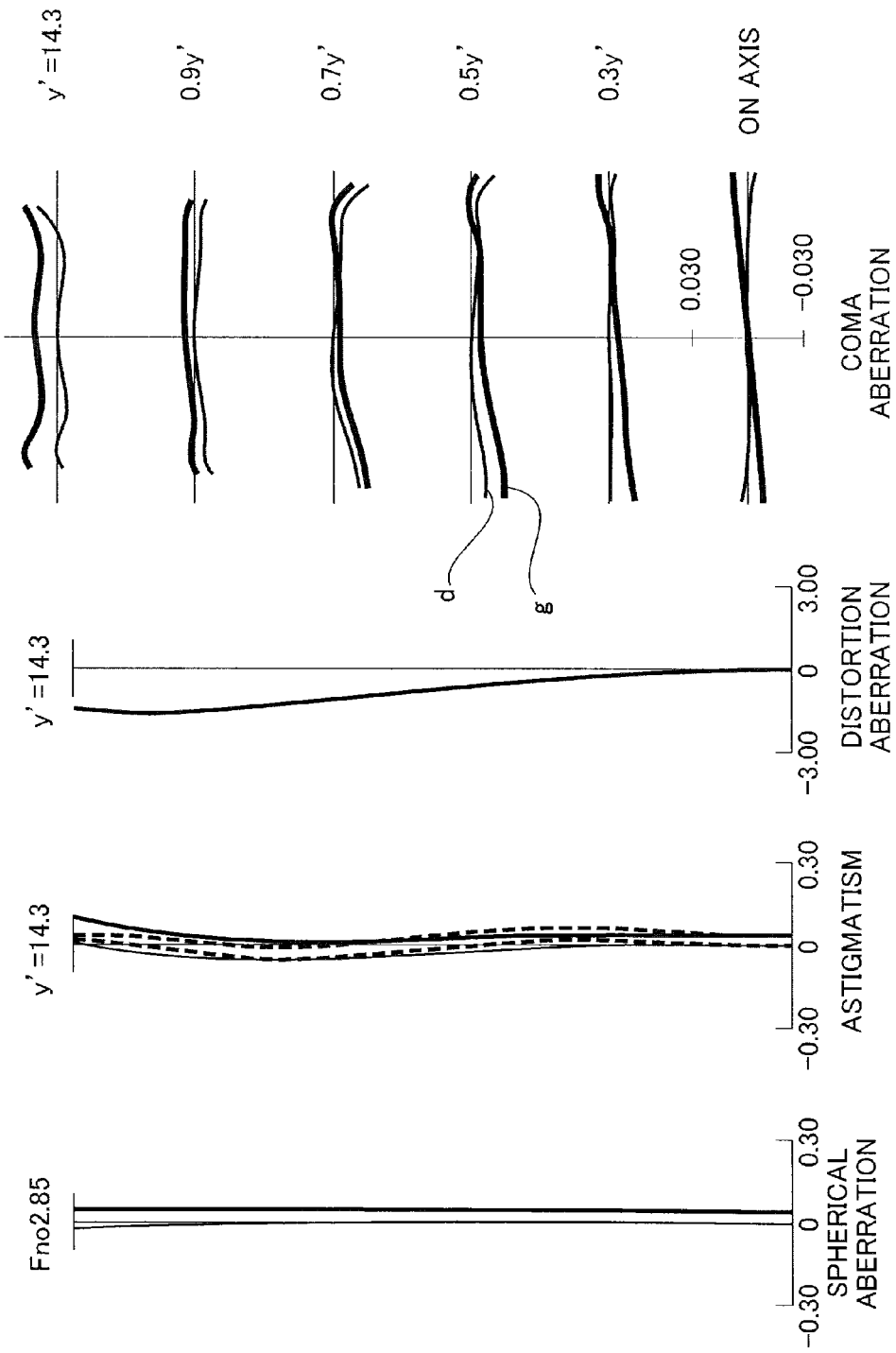
FIG. 10 is aberration curve diagrams showing aberrations of spherical aberration, astigmatism, distortion aberration and coma aberration in regard to a d line and a g line in the imaging optical system according to Example 5 of the present invention shown in FIG. 9.
Figure 11:
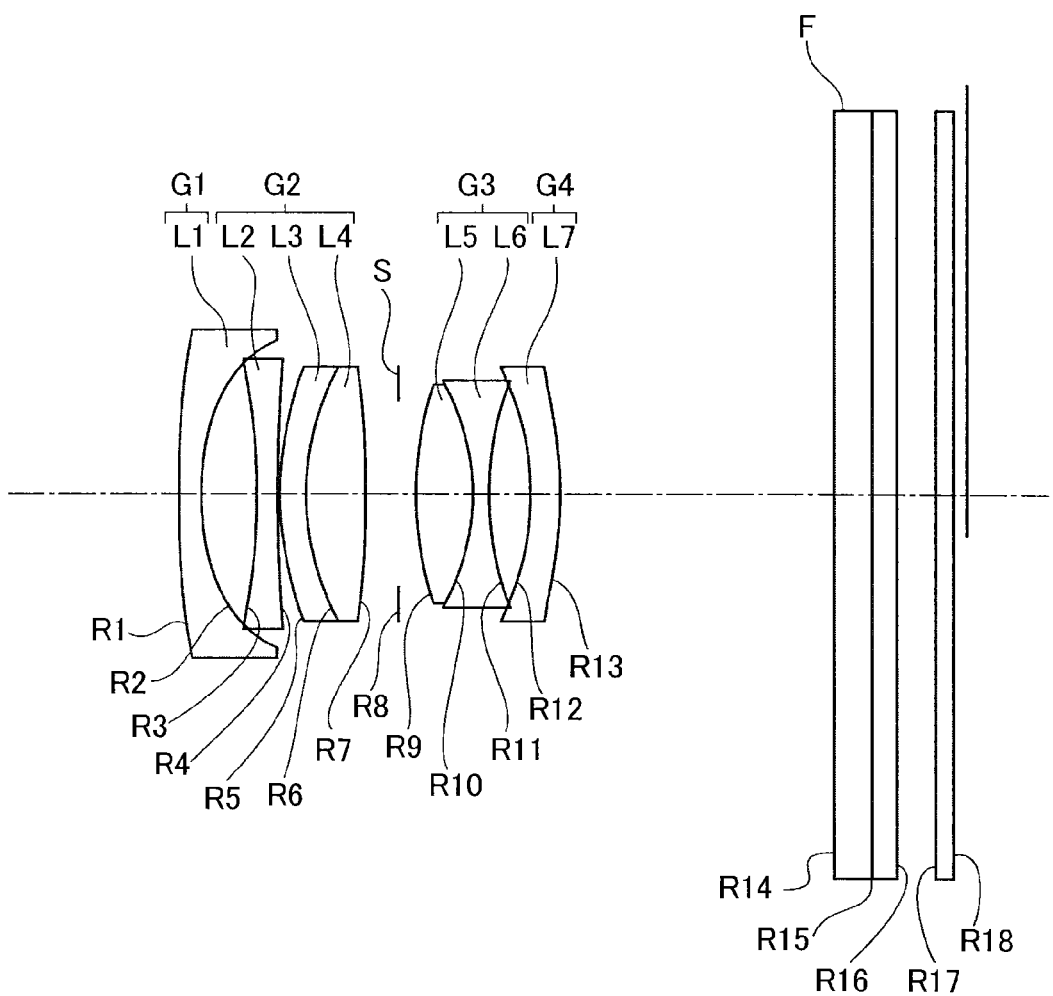
FIG. 11 is a longitudinal cross section along an optical axis showing a section configuration of an imaging optical system in accordance with Example 6 according to Sixth embodiment of the present invention.
Figure 12:
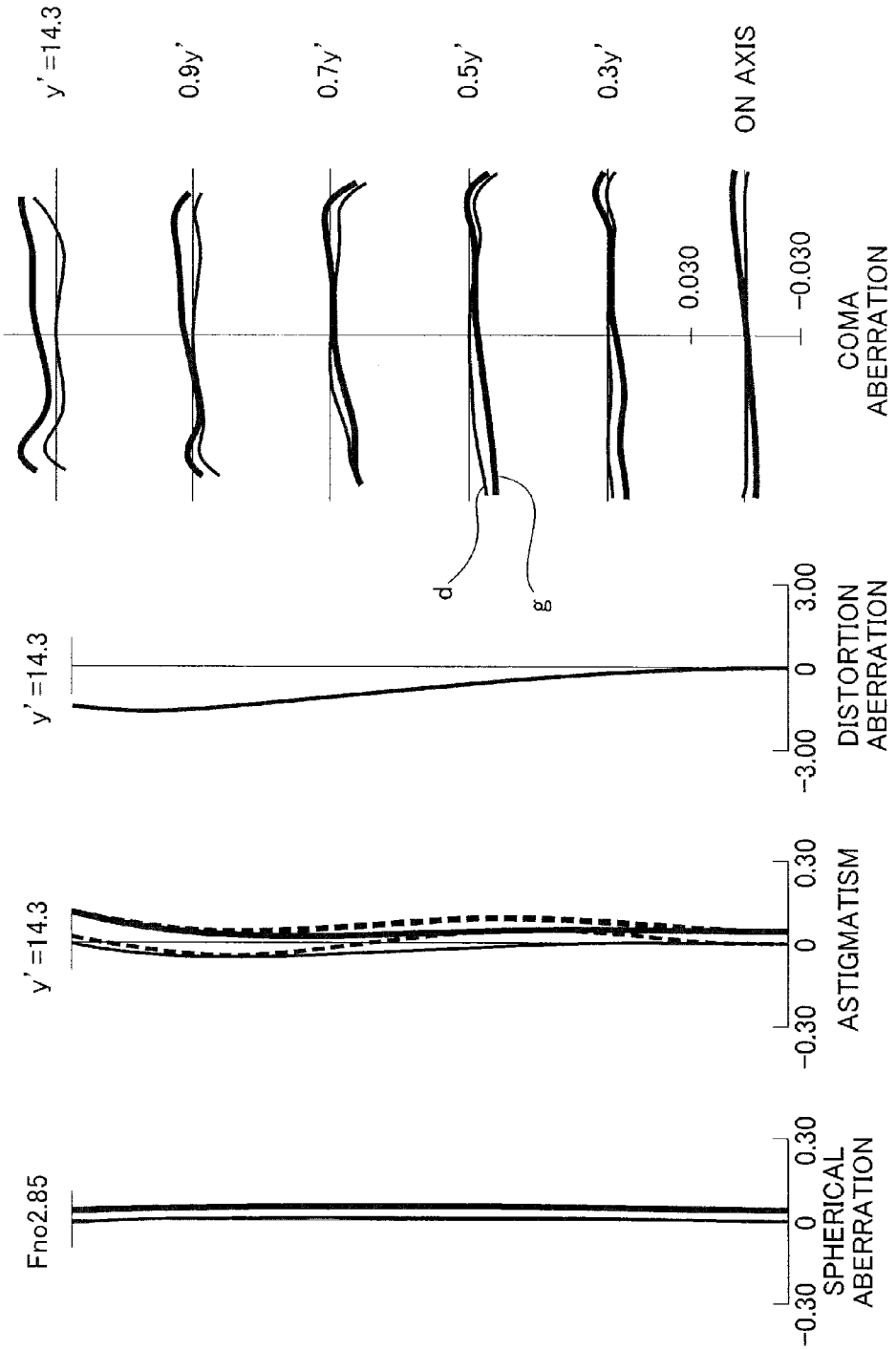
FIG. 12 is aberration curve diagrams showing aberrations of spherical aberration, astigmatism, distortion aberration and coma aberration in regard to a d line and a g line in the imaging optical system according to Example 6 of the present invention shown in FIG. 11.

FIG. 1 and FIG. 2 are diagrams for explaining an imaging lens as an imaging optical system in Example 1 according to First embodiment of the present invention. FIG. 3 and FIG. 4 are diagrams for explaining an imaging lens in Example 2 according to Second Embodiment of the present invention. FIG. 5 and FIG. 6 are diagrams for explaining an imaging lens in Example 3 according to Third embodiment of the present invention. FIG. 7 and FIG. 8 are diagrams for explaining an imaging lens in Example 4 according to Fourth embodiment of the present invention. FIG. 9 and FIG. 10 are diagrams for explaining an imaging lens in Example 5 according to Fifth embodiment of the present invention. FIG. 11 and FIG. 12 are diagrams for explaining an imaging lens in Example 6 according to Sixth embodiment of the present invention.

It should be noted that in each of Examples 1 to 6, a maximum image height is 14.3 mm.

In an imaging lens of each of Examples 1 to 6, a parallel flat plate F arranged on the image plane side of the fourth lens group is assumed to be formed of various kinds of filters such as an optical low-pass filter, an infrared cut filter and the like, or sheets of cover glass (seal glass) of light-receiving elements of a CMOS sensor or the like.

It should be noted that a glass material of an optical glass used in each of Examples 1 to 6 is shown in an optical glass material name of each product by HOYA Corporation (HOYA), OHARA, Inc. (OHARA), and SUMITA OPTICAL GLASS, Inc. (SUMITA).

The aberration of each of Examples 1 to 6 is corrected in a high level, and spherical aberration and axial chromatic aberration are very small. Astigmatism, curvature of field and chromatic aberration of magnification are also sufficiently small, and coma aberration and disturbance of a color difference are also restricted to a maximum peripheral portion appropriately. Each example of Examples 1 to 6 makes it clear that the imaging lens configured as the imaging optical system as in the case of the present invention is formed of a high-performance imaging lens that has a wide angle of a little more than a 38-degree half field angle and a large aperture of approximately F2.8, but is made to be sufficiently small-sized in regard to an entire lens length, a total lens thickness and a lens diameter, and has very excellent image performance.

Meanings of codes in common to the respective examples of Examples 1 to 6 are as follows.

f: Focal distance of an entire optical system
F: F number
ω: Half field angle
γ': Maximum image height
R: Curvature radius (paraxial curvature radius in regard to aspheric surface)
D: Interval between surfaces
Nd: Refractive index
νd: Abbe number In Examples 1 to 6, several lens surfaces are formed as aspheric surfaces. For forming the aspheric surface, in some cases each lens surface is formed directly as an aspheric surface as a so-called mold aspheric lens. In addition, in some cases a resin thin film for forming an aspheric surface is, as a so-called hybrid aspheric lens, provided on a lens surface of a e spherical lens to obtain the aspheric surface. Any of them may be adopted. As to such an aspheric shape, a displacement X (that is, aspheric surface amount in an optical axis direction) in the optical axis direction in a position of a height H from the optical axis on a basis of a top point of the surface is defined by the following expression (7), where a conical constant of an aspheric surface is K, a fourth-order aspheric coefficient is $A_4$, a sixth-order aspheric coefficient is $A_6$, an eighth-order aspheric coefficient is $A_8$, a tenth-order aspheric coefficient is $A_{10}$, and a reciprocal of a paraxial curvature radius is C.

$$X = \frac{CH^2}{1+\sqrt{\{1-(1+K)C^2H^2\}}} + A_4 \cdot H^4 + A_6 \cdot H^6 + A_8 \cdot H^8 + A_{10} \cdot H^{10} \quad (7)$$

Example 1

FIG. 1 shows a lens configuration in a longitudinal cross section along the optical axis of the optical system in the imaging lens as the imaging optical system according to First embodiment and Example 1 of the present invention.

That is, an optical system of an imaging lens according to Example 1 of the present invention is, as shown in FIG. 1, configured by arranging a first lens L1, a second lens L2, a third lens L3, a fourth lens L4, an aperture stop S, a fifth lens L5, a sixth lens L6 and a seventh lens L7 in the order from an object side to an image plane side, wherein the third lens L3 and the fourth lens L4, and the fifth lens L5 and the sixth lens L6 respectively are configured as cemented lenses, and are configured as, what is called, a seven-element in five-group configuration.

In terms of configuration of a lens group, a first lens group G1 having negative refracting power is constituted of the first lens L1, and a second lens group G2 having positive refracting power is constituted of the second lens L2 to the fourth lens L4. A third lens group G3 having positive refracting power is constituted of the fifth lens L5 and the sixth lens L6, and a fourth lens group G4 having negative refracting power is constituted of the seventh lens L7. That is, the optical system of the imaging lens shown in FIG. 1 is configured by arranging the first lens group G1, the second lens group G2, the aperture stop S, the third lens group G3 and the fourth lens group G4 in the order from the object side to the image plane side.

In detail, in the order from the object side to the image plane side, the first lens group G1 is configured to dispose the first lens L1 which is formed as a negative meniscus lens having an aspheric concave surface on the image plane side which has a larger curvature than a surface on the object side to show negative refracting power. The second lens group G2 is configured to dispose the second lens L2 which is formed as a negative plano-concave lens having a concave surface on the object side, the third lens L3 which is formed as a negative meniscus lens having a convex surface on the object side, and the fourth lens L4 which is formed as a positive biconvex lens having a convex surface on the object side which has a larger curvature than that on the image plane side to show negative refracting power. It should be noted that two lens elements of the third lens L3 and the fourth lens L4 make close contact with each other to be cemented together, thus forming a cemented lens of two lens elements.

The aperture stop S is disposed between the second lens group G2 and the third lens group G3.

In the order from the object side to the image plane side, the third lens group G3 is configured to dispose the fifth lens L5 which is formed as a positive biconvex lens having a convex surface on the image plane side which has a larger curvature than that on the object side, and the sixth lens L6 which is formed as a negative biconcave lens having a concave surface on the object side which has a larger curvature than that on the image plane side to show positive refracting power. Two lens elements of the fifth lens L5 and the sixth lens L6 in the third lens group G3 make close contact with each other to be cemented together, thus forming a cemented lens made of two lens elements. The fourth lens group G4 is configured to dispose the seventh lens L7 which is formed as a negative meniscus lens having a concave surface on the object side and an aspheric surface on the image plane side to show negative refracting power.

Further, behind the fourth lens group G4, that is, on the image plane side is disposed filter glass F that shows various filters of an optical low-pass filter, an infrared cut filter, and the like, and a cover glass (seal glass) of light-receiving elements, as equivalent parallel flat plates.

In an imaging optical system of a type using a solid-state image sensor of a CCD (Charged-Coupled Device) sensor, a CMOS (Complementary Metal-Oxide Semiconductor) sensor or the like, at least one of back insert glass, a low-pass filter, an infrared cut glass, and cover glass for protecting a light-receiving surface of the solid-state image sensor is interposed. In the present example, the above-mentioned filter glass F representative of them is equivalently shown as three parallel flat plates. It should be noted that also in each of Example 2 to Example 6, filter glass F is equivalently shown as three parallel flat plates, but is, as similar to the filter glass F in the present example, representative of at least one of the back insert glass, the low-pass filter, the infrared cut glass, and the cover glass.

The first lens group G1, the second lens group G2, the aperture stop S, the third lens group G3, and the fourth lens group G4 are supported substantially integrally by an appropriate support frame, or the like at least in use, and are moved integrally in a case of focusing for focusing on a photographic subject, thus performing focusing.

In FIG. 1 are indicated surface numbers of the respective optical surfaces in the optical system of the imaging lens. It should be noted that each reference code shown in FIG. 1 is independently used in each example for avoiding complication of an explanation due to an increase of a digit number of the reference code, and therefore, reference codes in common to those in FIG. 3, FIG. 5, FIG. 7, FIG. 9, FIG. 11 and the like are used.

In Example 1, a focal distance f of the entire optical system, an open F number Fno, and a half field angle ω (degree) are respectively f=18.30, Fno=2.85, and ω=38.42, and optical characteristics of each optical element in Example 1, which are a curvature radius (a paraxial curvature radius in regard to an aspheric surface) R of the optical surface, an interval D between adjacent optical surfaces, a refractive index Nd, an Abbe number vd, an optical glass material name, and the like, are as shown in the following Table 1.

TABLE 1 f = 18.30, Fno = 2.85, ω = 38.42

| SURFACE NUMBER | R | D | Nd | vd | OPTICAL GLASS MATERIAL NAME | REMARKS | |
|---|---|---|---|---|---|---|---|
| 1 | 173.16800 | 0.80 | 1.51633 | 64.06 | L-BSL7 (OHARA) | L1 | G1 |
| 2* | 13.50900 | 1.93 | | | | | |
| 3 | −21.71100 | 0.84 | 1.64769 | 33.79 | S-TIM22 (OHARA) | L2 | G2 |
| 4 | ∞ | 0.10 | | | | | |
| 5 | 16.63300 | 0.80 | 1.84666 | 23.78 | S-TIH53 (OHARA) | L3 | |
| 6 | 10.69200 | 2.26 | 1.88300 | 40.76 | S-LAH58 (OHARA) | L4 | |
| 7 | −32.08900 | 1.51 | | | | | |
| 8 | (APERTURE STOP) | 0.99 | | | | | |
| 9 | 14.74200 | 2.85 | 1.88300 | 40.76 | S-LAH58 (OHARA) | L5 | G3 |
| 10 | −8.60000 | 0.60 | 1.68893 | 31.07 | S-TIM28 (OHARA) | L6 | |

TABLE 1-continued

| | f = 18.30, | | Fno = 2.85, | | ω = 38.42 | |
|---|---|---|---|---|---|---|
| SURFACE NUMBER | R | D | Nd | vd | OPTICAL GLASS MATERIAL NAME | REMARKS |
| 11 | 12.50700 | 1.80 | | | | |
| 12 | −12.81100 | 1.20 | 1.81000 | 40.99 | K-VC89 (SUMITA) | L7  G4 |
| 13* | −14.06000 | 10.23566 | | | | |
| 14 | ∞ | 1.5 | 1.52301 | 58.59 | VARIOUS FILTERS, AND THE LIKE | |
| 15 | ∞ | 1.0 | 1.54000 | 60.00 | VARIOUS FILTERS, AND THE LIKE | |
| 16 | ∞ | 1.37 | | | | |
| 17 | ∞ | 0.7 | 1.53770 | 66.60 | VARIOUS FILTERS, AND THE LIKE | |
| 18 | ∞ | BF | | | | |

In Table 1, the lens surface of the surface number shown by attaching "an asterisk of *" to the surface number is an aspheric surface. Manufacturing company names are described briefly with OHARA (OHARA, Inc.) and SUMITA (SUMITA OPTICAL GLASS, Inc.) after the optical glass material name of an optical glass lens.

That is, in Table 1, each optical surface of a second surface and a 13th surface on which "*" is attached is an aspheric surface, and parameters of each aspheric surface in the expression (7) are as follows.

Aspheric Surface Parameters
The Second Surface
K=3.65750,  $A_4$=7.78870E-05,  $A_6$=−3.02515E-06, $A_8$=1.83970E-07, $A_{10}$=−4.88835E-09
The 13th Surface
K=−1.82416,  $A_4$=1.79400E-04,  $A_6$=5.52949E-06, $A_8$=4.13662E-08, $A_{10}$=8.00503E-10

In this case, values corresponding to the conditional expressions (1) to (6) are as shown in the following Table 2, which respectively meet the conditional expressions (1) to (6).

TABLE 2

| Conditional Expression Calculation Result | | |
|---|---|---|
| CONDITIONAL EXPRESSION(1) | 0.60 < IY/AP < 0.85 | 0.748 |
| CONDITIONAL EXPRESSION(2) | 1.00 < AP/TL < 1.40 | 1.291 |
| CONDITIONAL EXPRESSION(3) | 0.50 < f12/f34 < 1.60 | 1.170 |
| CONDITIONAL EXPRESSION(4) | 0 < f/|f4| < 0.30 | 0.059 |
| CONDITIONAL EXPRESSION(5) | 0.70 < TL/f < 1.10 | 0.857 |
| CONDITIONAL EXPRESSION(6) | 1.00 < |AP/Rg41| < 2.50 | 1.491 |

FIG. 2 shows the respective aberration curve diagrams of various aberrations in regard to a d line and a g line in the imaging lens according to Example 1, that is, spherical aberration, astigmatism, distortion aberration and coma aberration. It should be noted that in the aberration curve diagrams in FIG. 2, a broken line in the spherical aberration indicates a sine condition, a solid line in the astigmatism indicates a sagittal plane, and a broken line in the astigmatism indicates a meridional plane. d and g in each aberration diagram of the spherical aberration, the astigmatism, and the coma aberration indicate a d line and a g line, respectively. These are true of aberration curve diagrams according to other examples.

Example 2

FIG. 3 shows a lens configuration in a longitudinal cross section along the optical axis of the optical system in the imaging lens as the imaging optical system according to Second embodiment and Example 2 of the present invention.

That is, the optical system of the imaging lens according to Example 2 of the present invention is, as shown in FIG. 3, configured by arranging a first lens L1, a second lens L2, a third lens L3, a fourth lens L4, an aperture stop S, a fifth lens L5, a sixth lens L6 and a seventh lens L7 in the order from an object side to an image plane side. The third lens L3 and the fourth lens L4, and the fifth lens L5 and the sixth lens L6 respectively are configured as cemented lenses, and are configured as, what is called, a seven-element in five-group configuration.

In terms of configuration of the lens group, a first lens group G1 having negative refracting power is constituted of the first lens L1, and a second lens group G2 having positive refracting power is constituted of the second lens L2 to the fourth lens L4. A third lens group G3 having positive refracting power is constituted of the fifth lens L5 and the sixth lens L6, and a fourth lens group G4 having negative refracting power is constituted of the seventh lens L7. That is, the optical system of the imaging lens shown in FIG. 3 is configured by arranging the first lens group G1, the second lens group G2, the aperture stop S, the third lens group G3, and the fourth lens group G4 in the order from the object side to the image plane side.

In detail, in the order from the object side to the image plane side, the first lens group G1 is configured to dispose the first lens L1 which is formed as a negative biconcave lens having an aspheric concave surface on the image plane side which has a larger curvature than a concave surface on the object side to show negative refracting power. The second lens group G2 is configured to dispose the second lens L2 which is formed as a negative plano-concave lens having a concave surface on the object side, the third lens L3 which is formed as a negative meniscus lens having a convex surface on the object side, and the fourth lens L4 which is formed as a positive biconvex lens having a convex surface on the object side which has a larger curvature than that on the image plane side to show positive refracting power. It should be noted that two lens elements of the third lens L3 and the fourth lens L4 make close contact with each other to be cemented together, thus forming a cemented lens of two lens elements.

The aperture stop S is disposed between the second lens group G2 and the third lens group G3.

In the order from the object side to the image plane side, the third lens group G3 is configured to dispose the fifth lens L5 which is formed as a positive biconvex lens having a convex surface on the image plane side which has a larger curvature than that on the object side, and the sixth lens L6 which is formed as a negative biconcave lens having a concave surface on the object side which has a larger curvature than that on the image plane side to show positive refracting power. Two lens elements of the fifth lens L5 and the sixth lens L6 in the third lens group G3 make close contact with each other to be cemented together, thus forming a cemented lens made of two lens elements. The fourth lens group G4 is configured to dispose the seventh lens L7 which is formed as a negative meniscus lens having a concave surface on the object side, and an aspheric surface on the image plane side to show negative refracting power.

Further, behind the fourth lens group G4, that is, on the image plane side is disposed filter glass F that shows various filters of the optical low-pass filter, the infrared cut filter, and the like, and cover glass (seal glass) of light-receiving elements, as equivalent parallel flat plates.

The first lens group G1, the second lens group G2, the aperture stop S, the third lens group G3, and the fourth lens group G4 are supported substantially integrally by an appropriate support frame, or the like at least in use, and are moved integrally in a case of focusing for focusing on a photographic subject, thus performing focusing.

In FIG. 3 are indicated surface numbers of the respective optical surfaces in the optical system of the imaging lens. It should be noted that each reference code shown in FIG. 3 is independently used for each example for avoiding complication of an explanation due to an increase of a digit number of the reference code. Therefore, even if reference codes in common to those in FIG. 1, FIG. 5, FIG. 7, FIG. 9, FIG. 11 and the like are used, the configuration corresponding to each reference code in one of the figures is not necessarily in common to the configuration corresponding to the common reference code in the other figure.

In Example 2, a focal distance f of the entire optical system, an open F number Fno, and a half field angle ω (degree) are respectively f=18.30, Fno=2.86, and ω=38.44. Optical characteristics of each optical element in Example 2, which are a curvature radius (a paraxial curvature radius in regard to an aspheric surface) R of the optical surface, an interval D between adjacent optical surfaces, a refractive index Nd, an Abbe number νd, an optical glass material name, and the like, are as shown in the following Table 3.

TABLE 3 f = 18.30, Fno = 2.86, ω = 38.44

| SURFACE NUMBER | R | D | Nd | νd | OPTICAL GLASS MATERIAL NAME | REMARKS | |
|---|---|---|---|---|---|---|---|
| 1 | −61.58400 | 0.80 | 1.51633 | 64.06 | L-BSL7 (OHARA) | L1 | G1 |
| 2* | 12.48300 | 1.80 | | | | | |
| 3 | −42.26300 | 0.92 | 1.68893 | 31.07 | S-TIM28 (OHARA) | L2 | G2 |
| 4 | ∞ | 0.10 | | | | L3 | |
| 5 | 12.87300 | 0.80 | 1.84666 | 23.78 | S-TIH53 (OHARA) | | |
| 6 | 9.42200 | 2.48 | 1.81600 | 46.62 | S-LAH59 (OHARA) | | |
| 7 | −35.5090 | 1.505 | | | | L4 | G3 |
| 8 | (APERTURE STOP) | 1.00 | | | | L5 | |
| 9 | 15.16200 | 2.58 | 1.81600 | 46.6 | S-LAH59 (OHARA) | | |
| 10 | −9.54700 | 0.60 | 1.59270 | 35.31 | S-FTM16 (OHARA) | L6 | |
| 11 | 11.96800 | 1.92 | | | | | |
| 12 | −10.35500 | 1.20 | 1.81000 | 40.99 | K-VC89 (SUMITA) | L7 | G4 |
| 13* | −12.17800 | 10.01982 | | | | | |
| 14 | ∞ | 1.63 | 1.52301 | 58.59 | VARIOUS FILTERS, AND THE LIKE | | |
| 15 | ∞ | 1.0 | 1.54000 | 60.00 | VARIOUS FILTERS, AND THE LIKE | | |
| 16 | ∞ | 1.37 | | | | | |
| 17 | ∞ | 0.7 | 1.53770 | 66.60 | VARIOUS FILTERS, AND THE LIKE | | |
| 18 | ∞ | BF | | | | | |

In Table 3, the lens surface of the surface number shown by attaching "an asterisk of *" to the surface number is an aspheric surface. Manufacturing company names are described briefly with OHARA (OHARA, Inc.) and SUMITA (SUMITA OPTICAL GLASS, Inc.) after the optical glass material name of an optical glass lens.

That is, in Table 3, each optical surface of a second surface and a 13th surface on which "*" is attached is an aspheric surface, and parameters of each aspheric surface in the expression (7) are as follows.

Aspheric Surface Parameters
The Second Surface
$K=2.40068$, $A_4=1.15154E-04$, $A_6=-1.77420E-06$, $A_8=1.22313E-07$, $A_{10}=-2.96548E-09$
The 13th Surface
$K=-1.21261$, $A_4=1.90076E-04$, $A_6=5.87997E-06$, $A_8=4.28098E-08$, $A_{10}=1.06127E-09$ In this case, values corresponding to the conditional expressions (1) to (6) are as shown in the following Table 4, which respectively meet the conditional expressions (1) to (6).

TABLE 4

Conditional Expression Calculation Result

| | | |
|---|---|---|
| CONDITIONAL EXPRESSION(1) | 0.60 < IY/AP < 0.85 | 0.751 |
| CONDITIONAL EXPRESSION(2) | 1.00 < AP/TL < 1.40 | 1.213 |
| CONDITIONAL EXPRESSION(3) | 0.50 < f12/f34 < 1.60 | 0.777 |
| CONDITIONAL EXPRESSION(4) | 0 < f/|f4| < 0.30 | 0.151 |
| CONDITIONAL EXPRESSION(5) | 0.70 < TL/f < 1.10 | 0.858 |
| CONDITIONAL EXPRESSION(6) | 1.00 < |AP/Rg41| < 2.50 | 1.8381 |

FIG. 4 shows the respective aberration curve diagrams of various aberrations in regard to a d line and a g line in the imaging lens according to Example 2, that is, spherical aberration, astigmatism, distortion aberration and coma aberration. It should be noted that in the aberration curve diagrams in FIG. 4, a broken line in the spherical aberration indicates a sine condition, a solid line in the astigmatism indicates a sagittal plane, and a broken line in the astigmatism indicates a meridional plane. d and g in each aberration diagram of the spherical aberration, the astigmatism, and the coma aberration indicate a d line and a g line respectively. These are true of aberration curve diagrams according to other examples.

Example 3

FIG. 5 shows a lens configuration in a longitudinal cross section along the optical axis of the optical system in the imaging lens as the imaging optical system according to Third embodiment and Example 3 of the present invention.

That is, the optical system of the imaging lens according to Example 3 of the present invention is, as shown in FIG. 5, configured by arranging a first lens L1, a second lens L2, a third lens L3, a fourth lens L4, an aperture stop S, a fifth lens L5, a sixth lens L6, and a seventh lens L7 in the order from an object side to an image plane side. The third lens L3 and the fourth lens L4, and the fifth lens L5 and the sixth lens L6 respectively are configured as cemented lenses, and are configured as, what is called, a seven-element in five-group configuration.

In terms of configuration of the lens group, a first lens group G1 having negative refracting power is constituted of the first lens L1, and a second lens group G2 having positive refracting power is constituted of the second lens L2 to the fourth lens L4. A third lens group G3 having positive refracting power is constituted of the fifth lens L5 and the sixth lens L6, and a fourth lens group G4 having negative refracting power is constituted of the seventh lens L7. That is, the optical system of the imaging lens shown in FIG. 5 is configured by arranging the first lens group G1, the second lens group G2, the aperture stop S, the third lens group G3, and the fourth lens group G4 in the order from an object side to an image plane side.

In detail, in the order from the object side to the image plane side, the first lens group G1 is configured to dispose the first lens L1 which is formed as a negative biconcave lens having an aspheric concave surface on the image plane side which as a larger curvature than a concave surface on the object side to show negative refracting power. The second lens group G2 is configured to dispose the second lens L2 which is formed as a negative plano-concave lens having a concave surface on the object side, the third lens L3 which is formed as a negative meniscus lens having a convex surface on the object side, and the fourth lens L4 which is formed as a positive biconvex lens having a convex surface on the object side which has a larger curvature than that on the image plane side to show positive refracting power. It should be noted that two lens elements of the third lens L3 and the fourth lens L4 make close contact with each other to be cemented together, thus forming a cemented lens of two lens elements.

The aperture stop S is disposed between the second lens group G2 and the third lens group G3.

In the order from the object side to the image plane side, the third lens group G3 is configured to dispose the fifth lens L5 which is formed as a positive biconvex lens having a convex surface on the image plane side which has a larger curvature than that on the object side, and the sixth lens L6 which is formed as a negative biconcave lens having a concave surface on the object side which has a larger curvature than that on the image plane side to show positive refracting power. Two lens elements of the fifth lens L5 and the sixth lens L6 in the third lens group G3 make close contact with each other to be cemented together, thus forming a cemented lens of two lens elements. The fourth lens group G4 is configured to dispose the seventh lens L7 which is formed as a negative meniscus lens having a concave surface on the object side, and an aspheric surface on the image plane side to show negative refracting power.

Further, behind the fourth lens group G4, that is, on the image plane side is disposed filter glass F that shows various filters of the optical low-pass filter, the infrared cut filter and the like, and cover glass (seal glass) of light-receiving elements as equivalent parallel flat plates.

The first lens group G1, the second lens group G2, the aperture stop S, the third lens group G3, and the fourth lens group G4 are supported substantially integrally by an appropriate support frame, or the like at least in use, and are moved integrally in a case of focusing for focusing on a photographic subject, thus performing focusing.

In FIG. 5 are indicated surface numbers of the respective optical surfaces in the optical system of the imaging lens. It should be noted that each reference code shown in FIG. 5 is independently used for each example for avoiding complication of an explanation due to an increase of a digit number of the reference code. Therefore, even if reference codes in common to those in FIG. 1, FIG. 3, FIG. 7, FIG. 9, FIG. 11 and the like are used, the configuration corresponding to each reference code in one of the figures is not necessarily in common to the configuration corresponding to the common reference code in the other figure.

In this Example 3, a focal distance f of the entire optical system, an open F number Fno, and a half field angle ω (degree) are respectively f=18.30, Fno=2.83, and ω=38.42. Optical characteristics of each optical element in Example 3, which are a curvature radius (a paraxial curvature radius in regard to an aspheric surface) R of the optical surface, an interval D between adjacent optical surfaces, a refractive index Nd, an Abbe number νd, an optical glass material name, and the like, are as shown in the following Table 5.

TABLE 5 f = 18.30, Fno = 2.83, ω = 38.42

| SURFACE NUMBER | R | D | Nd | vd | OPTICAL GLASS MATERIAL NAME | REMARKS | |
|---|---|---|---|---|---|---|---|
| 1 | −89.28600 | 0.60 | 1.51633 | 64.06 | L-BSL7 (OHARA) | L1 | G1 |
| 2* | 13.05000 | 1.75 | | | | | |
| 3 | −33.19100 | 0.80 | 1.69895 | 30.13 | S-TIM35 (OHARA) | L2 | G2 |
| 4 | ∞ | 0.1 | | | | L3 | |
| 5 | 14.84000 | 1.16 | 1.84666 | 23.78 | S-TIH53 (OHARA) | | |
| 6 | 9.31400 | 2.42 | 1.88300 | 40.76 | S-LAH58 (OHARA) | | |
| 7 | −40.38700 | 1.10 | | | | L4 | G3 |
| 8 | (APERTURE STOP) | 1.40 | | | | L5 | |
| 9 | 15.48500 | 3.05 | 1.88300 | 40.76 | S-LAH58 (OHARA) | | |

TABLE 5-continued f = 18.30, Fno = 2.83, ω = 38.42

| SURFACE NUMBER | R | D | Nd | vd | OPTICAL GLASS MATERIAL NAME | REMARKS | |
|---|---|---|---|---|---|---|---|
| 10 | −9.30300 | 0.60 | 1.68893 | 31.07 | S-TIM28 (OHARA) | L6 | |
| 11 | 13.12000 | 1.82 | | | | | |
| 12 | −12.79500 | 1.20 | 1.80610 | 40.88 | L-LAH53 (OHARA) | L7 | G4 |
| 13* | −13.60500 | 10.10359 | | | | | |
| 14 | ∞ | 1.5 | 1.54892 | 69.31 | VARIOUS FILTERS, AND THE LIKE | | |
| 15 | ∞ | 1.0 | 1.54000 | 60.00 | VARIOUS FILTERS, AND THE LIKE | | |
| 16 | ∞ | 1.5 | | | | | |
| 17 | ∞ | 0.7 | 1.50000 | 64.60 | VARIOUS FILTERS, AND THE LIKE | | |
| 18 | ∞ | BF | | | | | |

In Table 5, the lens surface of the surface number shown by attaching "an asterisk of *" to the surface number is an aspheric surface. Manufacturing company name is described briefly with OHARA (OHARA, Inc.) after the optical glass material name of an optical glass lens.

That is, in Table 5, each optical surface of a second surface and a 13th surface on which "*" is attached is an aspheric surface, and parameters of each aspheric surface in the expression (7) are as follows.

Aspheric Surface Parameters

The Second Surface $K=2.53768$, $A_4=6.94076E-05$, $A_6=8.02001E-07$, $A_8=1.54854E-09$, $A_{10}=-9.06031E-10$ The 13th Surface $K=-17.27489$, $A_4=-5.46560E-04$, $A_6=2.82261E-05$, $A_8=-4.86001E-07$, $A_{10}=6.16411E-09$ In this case, values corresponding to the conditional expressions (1) to (6) are as shown in the following Table 6, which respectively meet the conditional expressions (1) to (6).

TABLE 6

| Conditional Expression Calculation Result | | |
|---|---|---|
| CONDITIONAL EXPRESSION(1) | 0.60 < IY/AP < 0.85 | 0.708 |
| CONDITIONAL EXPRESSION(2) | 1.00 < AP/TL < 1.40 | 1.262 |
| CONDITIONAL EXPRESSION(3) | 0.50 < f12/f34 < 1.60 | 1.115 |
| CONDITIONAL EXPRESSION(4) | 0 < f/|f4| < 0.30 | 0.023 |
| CONDITIONAL EXPRESSION(5) | 0.70 < TL/f < 1.10 | 0.874 |
| CONDITIONAL EXPRESSION(6) | 1.00 < |AP/Rg41| < 2.50 | 1.578 |

FIG. 6 shows the respective aberration curve diagrams of various aberrations in regard to a d line and a g line in the imaging lens according to Example 3, that is, spherical aberration, astigmatism, distortion aberration and coma aberration. It should be noted that in the aberration curve diagrams in FIG. 6, a broken line in the spherical aberration indicates a sine condition, a solid line in the astigmatism indicates a sagittal plane, and a broken line in the astigmatism indicates a meridional plane. d and g in each aberration diagram of the spherical aberration, the astigmatism, and the coma aberration indicate a d line and a g line respectively. These are true of aberration curve diagrams according to other examples.

Example 4

FIG. 7 shows a lens configuration in a longitudinal cross section along the optical axis of the optical system in the imaging lens as the imaging optical system according to Fourth embodiment and Example 4 of the present invention.

That is, the optical system of the imaging lens according to Example 4 of the present invention is, as shown in FIG. L7, configured by arranging a first lens L1, a second lens L2, a third lens L3, a fourth lens L4, an aperture stop S, a fifth lens L5, a sixth lens L6 and a seventh lens 7 in the order from an object side to an image plane side. The third lens L3 and the fourth lens L4, and the fifth lens L5 and the sixth lens L6 respectively are configured as cemented lenses, and are configured as, what is called, a seven-element in five-group configuration.

In terms of configuration of the lens group, a first lens group G1 having negative refracting power is constituted of the first lens L1, and a second lens group G2 having positive refracting power is constituted of the second lens L2 to the fourth lens L4. A third lens group G3 having positive refracting power is constituted of the fifth lens L5 and the sixth lens L6, and a fourth lens group G4 having negative refracting power is constituted of the seventh lens L7. That is, the optical system of the imaging lens shown in FIG. 7 is configured by arranging the first lens group G1, the second lens group G2, the aperture stop S, the third lens group G3, and the fourth lens group G4 in the order from the object side to the image plane side.

In detail, in the order from the object side to the image plane side, the first lens group G1 is configured to dispose the first lens L1 which is formed as a negative biconcave lens having an aspheric concave surface on the image plane side which has a larger curvature than a concave surface on the object side to show negative refracting power. The second lens group G2 is configured to dispose the second lens L2 which is formed as a negative plano-concave lens having a concave surface on the object side, the third lens L3 which is formed as a negative meniscus lens having a convex surface on the object side, and the fourth lens L4 which is formed as a positive biconvex lens having a convex surface on the object side which has a larger curvature than that on the image plane side to show positive refracting power. It should be noted that two lens elements of the third lens L3 and the fourth lens L4 make close contact with each other to be cemented together, thus forming a cemented lens of two lens elements.

The aperture stop S is disposed between the second lens group G2 and the third lens group G3.

In the order from the object side to the image plane side, the third lens group G3 is configured to dispose the fifth lens L5 which is formed as a positive biconvex lens having a convex surface on the image plane side which has a larger curvature than that on the object side, and the sixth lens L6 which is formed as a negative biconcave lens having a concave surface on the object side which has a larger curvature than that on the image plane side to show positive refracting power. Two lens elements of the fifth lens L5 and the sixth lens L6 in the third lens group G3 make close contact with each other to be cemented together, thus forming a cemented lens of two lens elements. The fourth lens group G4 is configured to dispose the seventh lens L7 which is formed as a negative meniscus lens having a concave surface on the object side, and an aspheric surface on the image plane side to show negative refracting power.

Further, behind the fourth lens group G4, that is, on the image plane side is disposed filter glass F that shows various filters of the optical low-pass filter, the infrared cut filter and the like, and cover glass (seal glass) of light-receiving elements, as equivalent parallel flat plates.

The first lens group G1, the second lens group G2, the aperture stop S, the third lens group G3, and the fourth lens group G4 are supported substantially integrally by an appropriate support frame or the like at least in use, and are moved integrally in a case of focusing time for focusing on a photographic subject, thus perform focusing.

In FIG. 7 are indicated surface numbers of the respective optical surfaces in the optical system of the imaging lens. It should be noted that each reference code shown in FIG. 7 is independently used for each example for avoiding complication of an explanation due to an increase of a digit number of the reference code.

In this Example 4, a focal distance f of the entire optical system, an open F number Fno, and a half field angle ω (degree) are respectively f=18.30, Fno=2.85, and ω=38.44. Optical characteristics of each optical element in Example 4, which are a curvature radius (a paraxial curvature radius in regard to an aspheric surface) R of the optical surface, an interval D between adjacent optical surfaces, a refractive index Nd, an Abbe number νd, an optical glass material name, and the like, are as shown in the following Table 7.

In Table 7, the lens surface of the surface number shown by attaching "an asterisk of *" to the surface number is an aspheric surface. Manufacturing company names are described briefly with OHARA (OHARA, Inc.) and HOYA (HOYA Corporation) after the optical glass material name of an optical glass lens.

That is, in Table 7, each optical surface of a second surface and a 13th surface on which "*" is attached is an aspheric surface, and parameters of each aspheric surface in the expression (7) are as follows.

Aspheric Surface Parameters
The Second Surface
K=0.99322, $A_4$=1.32749E-04, $A_6$=3.22758E-06, $A_8$=−4.86729E-08, $A_{10}$=9.86255E-10
The 13th Surface
K=−18.58415, $A_4$=−5.62871E-04, $A_6$=2.90511E-05, $A_8$=−5.10460E-07, $A_{10}$=6.39298E-09

In this case, values corresponding to the conditional expressions (1) to (6) are as shown in the following Table 8, which respectively meet the conditional expressions (1) to (6).

TABLE 8

| Conditional Expression Calculation Result | | |
|---|---|---|
| CONDITIONAL EXPRESSION(1) | 0.60 < IY/AP < 0.85 | 0.719 |
| CONDITIONAL EXPRESSION(2) | 1.00 < AP/TL < 1.40 | 1.171 |
| CONDITIONAL EXPRESSION(3) | 0.50 < f12/f34 < 1.60 | 1.260 |
| CONDITIONAL EXPRESSION(4) | 0 < f/|f4| < 0.30 | 0.002 |
| CONDITIONAL EXPRESSION(5) | 0.70 < TL/f < 1.10 | 0.929 |
| CONDITIONAL EXPRESSION(6) | 1.00 < |AP/Rg41| < 2.50 | 1.502 |

FIG. 8 shows the respective aberration curve diagrams of various aberrations in regard to a d line and a g line in the imaging lens according to Example 4, that is, spherical aberration, astigmatism, distortion aberration and coma aberration. It should be noted that in the aberration curve diagrams in FIG. 8, a broken line in the spherical aberration indicates a sine condition, a solid line in the astigmatism indicates a sagittal plane, and a broken line in the astigmatism indicates a meridional plane. d and g in each aberration diagram of the spherical aberration, the astigmatism, and the

TABLE 7

| f = 18.30, | | Fno = 2.85, | | ω = 38.44 | | | |
|---|---|---|---|---|---|---|---|
| SURFACE NUMBER | R | D | Nd | νd | OPTICAL GLASS MATERIAL NAME | REMARKS | |
| 1 | −89.28600 | 0.60 | 1.51633 | 64.06 | L-BSL7 (OHARA) | L1 | G1 |
| 2* | 12.59000 | 1.76 | | | | | |
| 3 | −35.40100 | 0.80 | 1.72825 | 28.46 | S-TIH10 (OHARA) | L2 | G2 |
| 4 | ∞ | 0.10 | | | | L3 | |
| 5 | 14.92400 | 1.40 | 1.84666 | 23.78 | S-TIH53 (OHARA) | | |
| 6 | 9.45600 | 2.28 | 1.88300 | 40.76 | S-LAH58 (OHARA) | | |
| 7 | −41.40900 | 1.10 | | | | L4 | G3 |
| 8 | (APERTURE STOP) | 1.40 | | | | L5 | |
| 9 | 15.57100 | 3.26 | 1.88300 | 40.76 | S-LAH58 (OHARA) | | |
| 10 | −9.26700 | 0.60 | 1.68893 | 31.07 | S-TIM28 (OHARA) | L6 | |
| 11 | 13.27200 | 1.81 | | | | | |
| 12 | −13.25100 | 1.20 | 1.80139 | 45.45 | M-TAF31 (HOYA) | L7 | G4 |
| 13* | −13.80700 | 10.20019 | | | | | |
| 14 | ∞ | 1.5 | 1.54892 | 69.31 | VARIOUS FILTERS, AND THE LIKE | | |
| 15 | ∞ | 1.0 | 1.54000 | 60.00 | VARIOUS FILTERS, AND THE LIKE | | |
| 16 | ∞ | 1.5 | | | | | |
| 17 | ∞ | 0.7 | 1.50000 | 64.00 | VARIOUS FILTERS, AND THE LIKE | | |
| 18 | ∞ | BF | | | | | | coma aberration indicate a d line and a g line respectively. These are true of aberration curve diagrams according to other examples.

Example 5

FIG. 9 shows a lens configuration in a longitudinal cross section along the optical axis of the optical system in the imaging lens as the imaging optical system according to Fifth embodiment and Example 5 of the present invention.

That is, the optical system of the imaging lens according to Example 5 of the present invention is, as shown in FIG. 9, configured by arranging a first lens L1, a second lens L2, a third lens L3, a fourth lens L4, an aperture stop S, a fifth lens L5, a sixth lens L6 and a seventh lens L7 in the order from an object side to an image plane side. The third lens L3 and the fourth lens L4, and the fifth lens L5 and the sixth lens L6 respectively are configured as cemented lenses, and are configured as, what is called, a seven-element in five-group configuration.

In terms of configuration of the lens group, a first lens group G1 having negative refracting power is constituted of the first lens L1, and a second lens group G2 having positive refracting power is constituted of the second lens L2 to the fourth lens L4. A third lens group G3 having positive refracting power is constituted of the fifth lens L5 and the sixth lens L6, and a fourth lens group G4 having negative refracting power is constituted of the seventh lens L7. That is, the optical system of the imaging lens shown in FIG. 9 is configured by arranging the first lens group G1, the second lens group G2, the aperture stop S, the third lens group G3, and the fourth lens group G4 in the order from the object side to the image plane side.

In detail, in the order from the object side to the image plane side, the first lens group G1 is configured to dispose the first lens L1 which is formed as a negative biconcave lens having an aspheric concave surface on the image plane side which has a larger curvature than a concave surface on the object side to show negative refracting power. The second lens group G2 is configured to dispose the second lens L2 which is formed as a negative meniscus lens having a concave surface on the object side, the third lens L3 which is formed as a negative meniscus lens having a convex surface on the object side, and the fourth lens L4 which is formed as a positive biconvex lens having a convex surface on the object side which has a larger curvature than that on the image plane side to show positive refracting power. It should be noted that two lens elements of the third lens L3 and the fourth lens L4 make close contact with each other to be cemented together, thus forming a cemented lens of two lens elements.

The aperture stop S is disposed between the second lens group G2 and the third lens group G3.

In the order from the object side to the image plane side, the third lens group G3 is configured to dispose the fifth lens L5 which is formed as a positive biconvex lens having a convex surface on the image plane side which has a larger curvature than that on the object side, and the sixth lens L6 which is formed as a negative biconcave lens having a concave surface on the object side which has a larger curvature than that on the image plane side to show positive refracting power. Two lens elements of the fifth lens L5 and the sixth lens L6 in the third lens group G3 make close contact with each other to be cemented together, thus forming a cemented lens of two lens elements. The fourth lens group G4 is configured to dispose the seventh lens L7 which is formed as a negative meniscus lens having a concave surface on the object side, and an aspheric surface on the image plane side to show negative refracting power.

Further, behind the fourth lens group G4, that is, on the image plane side is disposed filter glass F that shows various filters of the optical low-pass filter, the infrared cut filter and the like, and cover glass (seal glass) of light-receiving elements, as equivalent parallel flat plates.

The first lens group G1, the second lens group G2, the aperture stop S, the third lens group G3, and the fourth lens group G4 are supported substantially integrally by an appropriate support frame, or the like at least in use, and are moved integrally in a case of focusing for focusing on a photographic subject, thus performing focusing.

In FIG. 9 are indicated surface numbers of the respective optical surfaces in the optical system of the imaging lens. It should be noted that each reference code shown in FIG. 9 is independently used for each example for avoiding complication of an explanation due to an increase of a digit number of the reference code.

In this Example 5, a focal distance f of the entire optical system, an open F number Fno, and a half field angle ω (degree) are respectively f=18.30, Fno=2.85, and ω=38.42. Optical characteristics of each optical element in Example 5, which are a curvature radius (a paraxial curvature radius in regard to an aspheric surface) R of the optical surface, an interval D between adjacent optical surfaces, a refractive index Nd, an Abbe number vd, an optical glass material name, and the like, are as shown in the following Table 9.

TABLE 9

| | f = 18.30, | Fno = 2.85, | ω = 38.42 | | | |
|---|---|---|---|---|---|---|
| SURFACE NUMBER | R | D | Nd | vd | OPTICAL GLASS MATERIAL NAME | REMARKS |
| 1 | −89.28600 | 1.00 | 1.51633 | 64.06 | L-BSL7 (OHARA) | L1 G1 |
| 2* | 15.04500 | 1.84 | | | | |
| 3 | −26.62300 | 0.80 | 1.72825 | 28.46 | S-TIH10 (OHARA) | L2 G2 |
| 4 | −208.20400 | 0.10 | | | | L3 |
| 5 | 15.06400 | 0.97 | 1.84666 | 23.78 | S-TIH53 (OHARA) | |
| 6 | 9.62300 | 2.93 | 1.88300 | 40.76 | S-LAH58 (OHARA) | |
| 7 | −35.95600 | 1.10 | | | | L4 G3 |
| 8 | (APERTURE STOP) | 1.40 | | | | L5 |
| 9 | 14.34100 | 2.68 | 1.88300 | 40.76 | S-LAH58 (OHARA) | |
| 10 | −9.62500 | 0.60 | 1.68893 | 31.07 | S-TIM28 (OHARA) | L6 |
| 11 | 12.48000 | 1.88 | | | | |
| 12 | −11.85900 | 1.20 | 1.80610 | 40.88 | L-LAH53 (OHARA) | L7 G4 |
| 13* | −14.05200 | 9.57728 | | | | |

TABLE 9-continued

| | f = 18.30, | | Fno = 2.85, | | ω = 38.42 | |
|---|---|---|---|---|---|---|
| SURFACE NUMBER | R | D | Nd | vd | OPTICAL GLASS MATERIAL NAME | REMARKS |
| 14 | ∞ | 1.5 | 1.54892 | 69.31 | VARIOUS FILTERS, AND THE LIKE | |
| 15 | ∞ | 1.0 | 1.54000 | 60.00 | VARIOUS FILTERS, AND THE LIKE | |
| 16 | ∞ | 1.5 | | | | |
| 17 | ∞ | 0.7 | 1.50000 | 64.00 | VARIOUS FILTERS, AND THE LIKE | |
| 18 | ∞ | BF | | | | |

In Table 9, the lens surface of the surface number shown by attaching "an asterisk of *" to the surface number is an aspheric surface. A manufacturing company name is described briefly with OHARA (OHARA, Inc.) after the optical glass material name of an optical glass lens.

That is, in Table 9, each optical surface of a second surface and a 13th surface on which "*" is attached is an aspheric surface, and parameters of each aspheric surface in the expression (7) are as follows.

Aspheric Surface Parameters

The Second Surface $K=3.97738$, $A_4=8.45704E-05$, $A_6=-4.46178E-07$, $A_8=6.21524E-08$, $A_{10}=-1.75388E-09$ The 13th Surface $K=-15.07055$, $A_4=-3.70772E-04$, $A_6=2.16275E-05$, $A_8=-2.90008E-07$, $A_{10}=3.40041E-09$ In this case, values corresponding to the conditional expressions (1) to (6) are as shown in the following Table 10, which respectively meet the conditional expressions (1) to (6).

TABLE 10

| Conditional Expression Calculation Result | | |
|---|---|---|
| CONDITIONAL EXPRESSION(1) | 0.60 < IY/AP < 0.85 | 0.759 |
| CONDITIONAL EXPRESSION(2) | 1.00 < AP/TL < 1.40 | 1.143 |
| CONDITIONAL EXPRESSION(3) | 0.50 < f12/f34 < 1.60 | 0.818 |
| CONDITIONAL EXPRESSION(4) | 0 < f/|f4| < 0.30 | 0.147 |
| CONDITIONAL EXPRESSION(5) | 0.70 < TL/f < 1.10 | 0.902 |
| CONDITIONAL EXPRESSION(6) | 1.00 < |AP/Rg41| < 2.50 | 1.590 |

FIG. 10 shows the respective aberration curve diagrams of various aberrations in regard to a d line and a g line in the imaging lens according to Example 5, that is, spherical aberration, astigmatism, distortion aberration, and coma aberration. It should be noted that in the aberration curve diagrams in FIG. 10, a broken line in the spherical aberration indicates a sine condition, a solid line in the astigmatism indicates a sagittal plane, and a broken line in the astigmatism indicates a meridional plane. d and g in each aberration diagram of the spherical aberration, the astigmatism, and the coma aberration indicate a d line and a g line respectively. These are true of aberration curve diagrams according to other examples.

Example 6

FIG. 11 shows a lens configuration in a longitudinal cross section along the optical axis of the optical system in the imaging lens as the imaging optical system according to Sixth embodiment and Example 6 of the present invention.

That is, the optical system of the imaging lens according to Example 6 of the present invention is, as shown in FIG. 11, configured by arranging a first lens L1, a second lens L2, a third lens L3, a fourth lens L4, an aperture stop S, a fifth lens L5, a sixth lens L6, and a seventh lens L7 in the order from an object side to an image plane side. The third lens L3 and the fourth lens L4, and the fifth lens L5 and the sixth lens L6 respectively are configured as cemented lenses, and are configured as, what is called, a seven-element in five-group configuration.

In terms of configuration of the lens group, a first lens group G1 having negative refracting power is constituted of the first lens L1, and a second lens group G2 having positive refracting power is constituted of the second lens L2 to the fourth lens L4. A third lens group G3 having positive refracting power is constituted of the fifth lens L5 and the sixth lens L6, and a fourth lens group G4 having negative refracting power is constituted of the seventh lens L7. That is, the optical system of the imaging lens shown in FIG. 11 is configured by arranging the first lens group G1, the second lens group G2, the aperture stop S, the third lens group G3, and the fourth lens group G4 in the order from the object side to the image plane side.

In detail, in the order from the object side to the image plane side, the first lens group G1 is configured to dispose the first lens L1 which is formed as a negative meniscus lens having an aspheric concave surface on the image plane side to show negative refracting power. The second lens group G2 is configured to dispose the second lens L2 which is formed as a negative biconcave lens having a concave surface on the object side and a concave surface on the image side which has a larger curvature than that on the object side, the third lens L3 which is formed as a negative meniscus lens having a convex surface on the object side, and the fourth lens L4 which is formed as a positive biconvex lens having a convex surface on the object side having a larger curvature than that on the image plane side to show positive refracting power. It should be noted that two lens elements of the third lens L3 and the fourth lens L4 make close contact with each other to be cemented together, thus forming a cemented lens of two lens elements.

The aperture stop S is disposed between the second lens group G2 and the third lens group G3.

In the order from the object side to the image plane side, the third lens group G3 is configured to dispose the fifth lens L5 which is formed as a positive biconvex lens having a convex surface on the image plane side which has a larger curvature than that on the object side, and the sixth lens L6 which is formed as a negative biconcave lens having a concave surface on the object side which has a larger curvature than that on the image plane side to show positive refracting power. Two lens elements of the fifth lens L5 and the sixth lens L6 in the third lens group G3 make close contact with each other to be cemented together, thus forming a cemented lens of two lens elements. The fourth lens group G4 is configured to dispose the seventh lens L7 which is formed as a negative meniscus lens having a concave surface on the object side, and an aspheric surface on the image plane side to show negative refracting power.

Further, behind the fourth lens group G4, that is, on the image plane side is disposed filter glass F that shows various filters of the optical low-pass filter, the infrared cut filter and the like, and cover glass (seal glass) of light-receiving elements, as equivalent parallel flat plates.

The first lens group G1, the second lens group G2, the aperture stop S, the third lens group G3, and the fourth lens group G4 are supported substantially integrally by an appropriate support frame, or the like at least in use, and are moved integrally in a case of focusing for focusing on a photographic subject, thus performing focusing.

In FIG. 11 are indicated surface numbers of the respective optical surfaces in the optical system of the imaging lens. It should be noted that each reference code shown in FIG. 11 is independently used for each example for avoiding complication of an explanation due to an increase of a digit number of the reference code. Therefore, even if reference codes in common to those in FIG. 1, FIG. 3, FIG. 5, FIG. 7, FIG. 9, and the like are used, the configuration corresponding to each reference code in one of the figures is not necessarily in common to the configuration corresponding to the common reference code in the other figure.

In Example 6, a focal distance f of the entire optical system, an open F number Fno, and a half field angle ω (degree) are respectively f=18.30, Fno=2.85, and ω=38.42. Optical characteristics of each optical element in the example 6, which are a curvature radius (a paraxial curvature radius in regard to an aspheric surface) R of the optical surface, an interval D between adjacent optical surfaces, a refractive index Nd, an Abbe number νd, an optical glass material name, and the like, are as shown in the next Table 11.

In Table 11, the lens surface of the surface number shown by attaching "an asterisk of *" to the surface number is an aspheric surface. Manufacturing company names are described briefly with and HOYA (HOYA Corporation) and OHARA (OHARA, Inc.) after the optical glass material name of an optical glass lens.

That is, in Table 11, each optical surface of a second surface and a 13th surface on which "*" is attached is an aspheric surface, and parameters of each aspheric surface in the expression (7) are as follows.

Aspheric Surface Parameters
The Second Surface
$K=2.02313$, $A_4=6.61565E-05$, $A_6=-2.97180E-06$, $A_8=2.12746E-07$, $A_{10}=-4.84798E-09$
The 13th Surface
$K=-11.86578$, $A_4=-3.80925E-04$, $A_6=2.39629E-05$, $A_8=-2.62883E-07$, $A_{10}=4.29423E-09$ In this case, values corresponding to the conditional expressions (1) to (6) are as shown in the following Table 12, which respectively meet the conditional expressions (1) to (6).

TABLE 12

| Conditional Expression Calculation Result | | |
|---|---|---|
| CONDITIONAL EXPRESSION(1) | 0.60 < IY/AP < 0.85 | 0.750 |
| CONDITIONAL EXPRESSION(2) | 1.00 < AP/TL < 1.40 | 1.267 |
| CONDITIONAL EXPRESSION(3) | 0.50 < f12/f34 < 1.60 | 1.293 |
| CONDITIONAL EXPRESSION(4) | 0 < f/|f4| < 0.30 | 0.072 |
| CONDITIONAL EXPRESSION(5) | 0.70 < TL/f < 1.10 | 0.822 |
| CONDITIONAL EXPRESSION(6) | 1.00 < |AP/Rg41| < 2.50 | 1.659 |

FIG. 12 shows the respective aberration curve diagrams of various aberrations in regard to a d line and a g line in the imaging lens according to Example 6, that is, spherical aberration, astigmatism, distortion aberration, and coma aberration. It should be noted that in the aberration curve diagrams in FIG. 12, a broken line in the spherical aberration indicates a sine condition, a solid line in the astigmatism indicates a sagittal plane, and a broken line in the astigmatism indicates a meridional plane. d and g in each aberration

TABLE 11

| f = 18.30, | | Fno = 2.85, | | ω = 38.42 | | |
|---|---|---|---|---|---|---|
| SURFACE NUMBER | R | D | Nd | vd | OPTICAL GLASS MATERIAL NAME | REMARKS |
| 1 | 38.15800 | 0.90 | 1.48749 | 70.45 | FC5 (HOYA) | L1 G1 |
| 2* | 10.53100 | 2.19 | | | | |
| 3 | −24.89100 | 0.80 | 1.68893 | 31.07 | S-TIM28 (OHARA) | L2 G2 |
| 4 | 70.37300 | 0.10 | | | | L3 |
| 5 | 13.43300 | 1.02 | 1.84666 | 23.78 | S-TIH53 (OHARA) | |
| 6 | 9.95400 | 2.35 | 1.88300 | 40.76 | S-LAH58 (OHARA) | |
| 7 | −43.00000 | 1.24 | | | | L4 G3 |
| 8 | (APERTURE STOP) | 0.76 | | | | L5 |
| 9 | 13.84900 | 2.27 | 1.88300 | 40.76 | S-LAH58 (OHARA) | |
| 10 | −8.45100 | 0.60 | 1.68893 | 31.07 | S-TIM28 (OHARA) | L6 |
| 11 | 12.12300 | 1.61 | | | | |
| 12 | −11.48900 | 1.20 | 1.80610 | 40.88 | L-LAH53 (OHARA) | L7 G4 |
| 13* | −12.73600 | 10.73619 | | | | |
| 14 | ∞ | 1.5 | 1.54892 | 69.31 | VARIOUS FILTERS, AND THE LIKE | |
| 15 | ∞ | 1.0 | 1.54000 | 60.00 | VARIOUS FILTERS, AND THE LIKE | |
| 16 | ∞ | 1.5 | | | | |
| 17 | ∞ | 0.7 | 1.50000 | 64.00 | VARIOUS FILTERS, AND THE LIKE | |
| 18 | ∞ | BF | | | | | diagram of the spherical aberration, the astigmatism, and the coma aberration indicate a d line and a g line respectively. These are true of aberration curve diagrams according to other examples.

Seventh Embodiment

Figure 13:
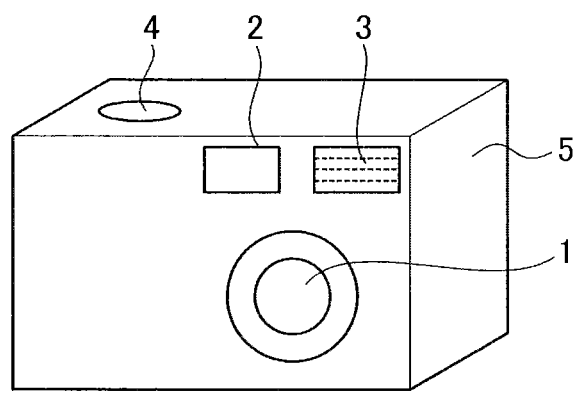
FIG. 13 is a perspective view of an outside appearance configuration of a digital camera as a camera device according to Seventh embodiment of the present invention as viewed from a front side, that is, a side of an object which is a photographic subject.
Figure 14:
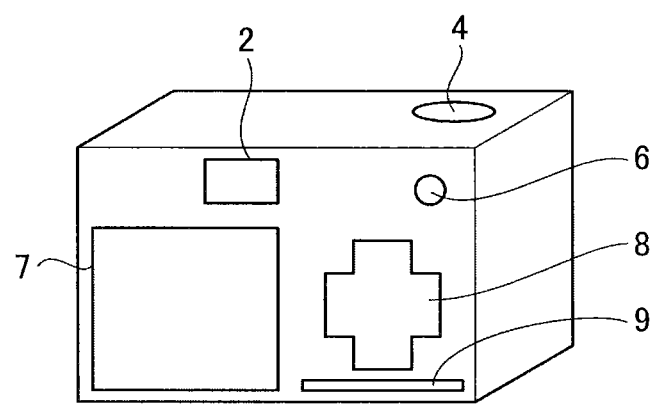
FIG. 14 is a perspective view of the outside appearance configuration of the digital camera in FIG. 13 as viewed from a back side, that is, a photographer side.
Figure 15:
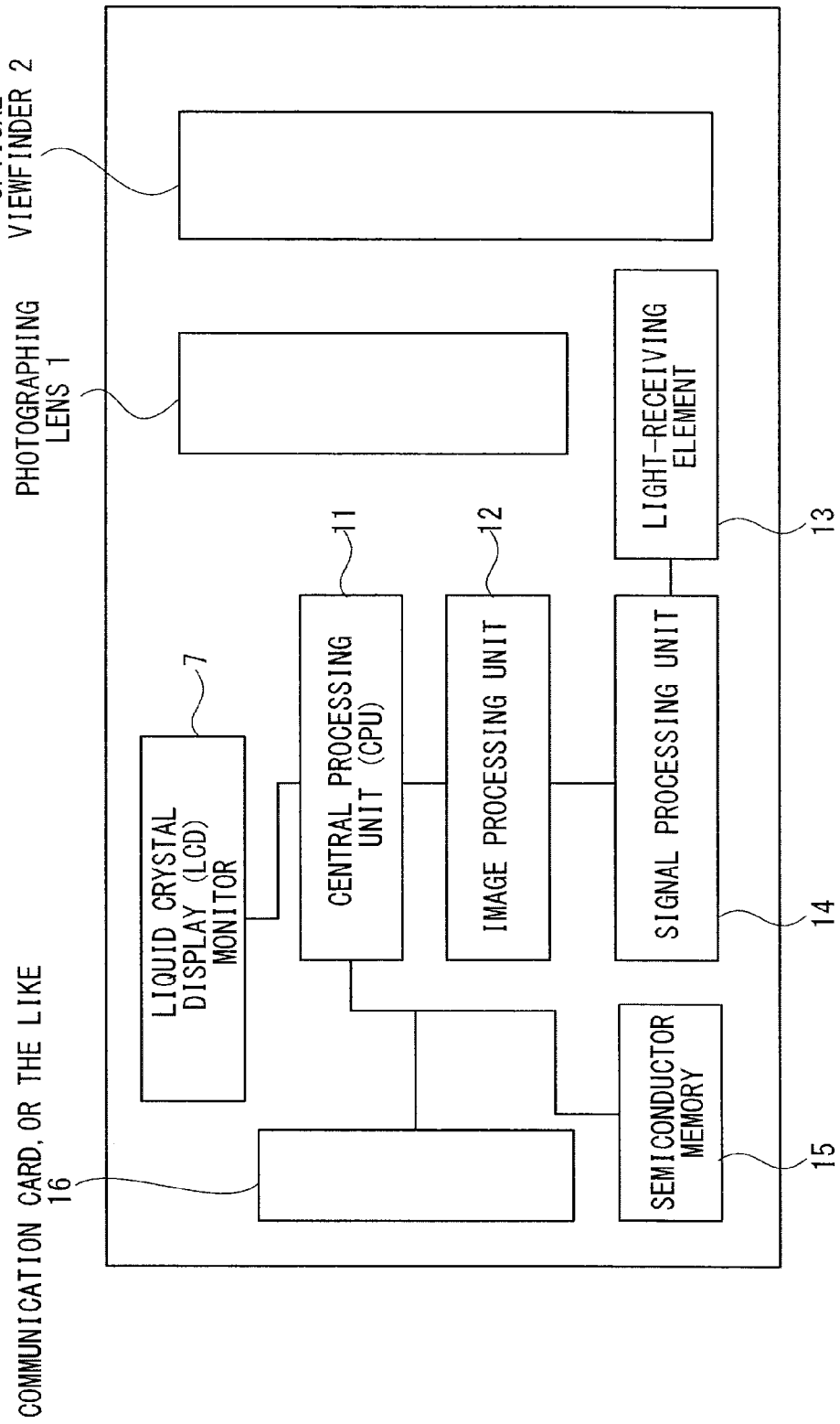
FIG. 15 is a block diagram schematically showing the functional configuration of the digital camera in FIG. 13 and FIG. 14.

Next, with reference to FIGS. 13 to 15, a digital camera as a camera device according to Seventh embodiment of the present invention that adopts the imaging optical system according to each of First to Sixth embodiments of the present invention described above will be explained. FIG. 13 is a perspective view schematically showing an outside appearance of a digital camera as viewed from a front side that is an object side, that is, a photographic subject, FIG. 14 is a perspective view schematically showing the outside appearance of the digital camera as viewed from a back side that is a photographer's side, and FIG. 15 is a schematic block diagram showing the functional configuration of the digital camera. It should be noted that herein, the camera device is explained by taking the digital camera as an example, but the imaging optical system according to the present invention may be adopted to a silver halide film camera using a silver halide film as an existing image recording medium.

In addition, there is widely used an information device in which a camera function is incorporated such as a mobile information terminal device, which is a so-called PDA (Personal Data Assistant), a mobile phone, or the like. This information device, although the outside appearance is more or less different, includes the function and the configuration substantially exactly similar to those of the digital camera, and the imaging optical system of the present invention may be adopted as an imaging optical system in such an information device.

As shown in FIGS. 13 to 15, the digital camera is provided with a photographing lens 1, an optical viewfinder 2, a flash 3, a shutter button 4, a camera body 5, a power switch 6, a liquid crystal display (LCD) monitor 7, an operating button 8, a memory card slot 9, and the like. Further, as shown in FIG. 15, the digital camera is provided with a central processor unit (CPU) 11, an image processing unit 12, a light-receiving element 13, a signal processing unit 14, a semiconductor memory 15, a communication card, or the like 16.

The digital camera includes the photographing lens 1 as an imaging optical system, and the light-receiving element 13 configured as an image sensor using the CMOS (Complementary Metal-Oxide Semiconductor) imaging element, the CCD (Charged-Coupled Device) imaging element, or the like, and reads an optical image of a photographic subject (object) imaged by the photographing lens 1 by the light-receiving element 13. The imaging optical system according to the present invention as explained in each of the above-mentioned First to Sixth embodiments is used as the photographing lens 1.

Output of the light-receiving element 13 is processed by the signal processing unit 14 that is controlled by the CPU 11, which is converted into digital image information. That is, such a digital camera includes a unit configured to convert an imaged image (photographic subject image) into digital image information, and this unit is substantially constituted of the light-receiving element 13, the signal processing unit 14, the CPU 11 for controlling them, and the like.

The image information digitalized by the signal processing unit 14 is subjected to predetermined image processing in the image processing unit 12 that is controlled by the CPU 11, which thereafter, is recorded in the semiconductor memory 15 of a non-volatile memory, or the like. In this case, the semiconductor memory 15 may be a memory card inserted in the memory card slot 9, or may be a semiconductor memory incorporated in a camera body (on-board). A photographing image can be displayed on the LCD monitor 7, and an image recorded in the semiconductor memory 15 can be also displayed thereon. The image recorded in the semiconductor memory 15 can be transmitted to an external device through the communication card, or the like 16 inserted in a communication card slot (not shown).

The photographing lens 1 is configured such that an object plane thereof is covered with a lens barrier (not shown) when carrying, and when a user operates the power switch 6 to be powered on, the lens barrier opens for the object plane to be exposed.

In many cases, focusing is performed with a half pressing operation of the shutter button 4. The focusing in the imaging optical system according to the present invention (imaging optical system shown in any of the above-mentioned Examples 1 to 6) can be performed by movement of all, or a part of lens groups in a plurality of groups of optical systems, or by movement of the light-receiving element. When the shutter button 4 is further pressed to create a complete pressing state, photographing is performed, and after that, the processing as described above is performed.

Upon displaying the image recorded in the semiconductor memory 15 on the LCD monitor 7, or transmitting the image recorded in the semiconductor memory 15 to the external device through the communication card, or the like 16, the operating button 8 is operated in a predetermined manner. The semiconductor memory 15, the communication card, or the like 16 are respectively inserted in exclusive or general-purpose slots, such as the memory card slot 9, the communication card slot, and the like for use.

In the digital camera (camera device) or the mobile information terminal device as described above, the photographing lens 1 using the imaging optical system as shown in each of First to Sixth embodiments may be used as the imaging optical system as described before. Accordingly, it is possible to realize a high image quality compact camera (imaging device) or mobile information terminal device that has a sufficient wide angle of a 76-degree field angle or more, a large aperture of approximately F2.8 or less, and uses the light-receiving element having the number of pixels of 10 mega pixels to 20 mega pixels or more.

According to embodiments of the present invention, it is possible to realize the imaging optical system that has high performance and a wide angle of an approximately 76-degree field angle, and is sufficiently small-sized and light in weight while having a large aperture of approximately F2.8 or less to be able to ensure very excellent image performance.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. An imaging optical system, comprising: in the order from an object side to an image plane side,
   a first lens group having negative refracting power that includes a negative lens having a concave surface on the image plane side;
   a second lens group having positive refracting power that includes, in the order from the object side to the image plane side, a negative lens having a concave surface on the object side, and a cemented lens of a negative lens and a positive lens, said negative lens of the cemented lens being on the object side and said positive lens of the cemented lens being on the image plane side and having a convex surface on the object side;
   an aperture stop;
   a third lens group having positive refracting power that consists of a cemented lens of a positive lens and a negative lens; and
   a fourth lens group having negative refracting power that consists of a negative lens having a concave surface on the object side,
   wherein the imaging optical system does not have any other lenses other than the lenses of the first to fourth lens groups between the first lens group and the fourth lens group, and
   wherein the imaging optical system is configured to satisfy the following conditional expression (1):

$$0.60 < IY/AP < 0.85 \tag{1}$$

where a maximum image height of the imaging optical system is IY, and a distance on an optical axis from an image plane to an exit pupil position of the imaging optical system is AP.

2. The imaging optical system according to claim 1, wherein the imaging optical system is configured to satisfy the following conditional expression (2):

$$1.00 < AP/TL < 1.40 \tag{2}$$

where the distance on the optical axis from the image plane to the exit pupil position of the imaging optical system is AP, and a distance on the optical axis from a forefront surface of the first lens group to a backmost surface of the fourth lens group when focusing on infinity is TL.

3. The imaging optical system according to claim 1, wherein an air lens that is formed between a backmost surface of the second lens group and a forefront surface of the third lens group has positive refracting power.

4. The imaging optical system according to claim 1, wherein the imaging optical system is configured to satisfy the following conditional expression (3):

$$0.50 < f12/f34 < 1.60 \tag{3}$$

where a combined focal distance of the first lens group and the second lens group is f12, and a combined focal distance of the third lens group and the fourth lens group is f34.

5. The imaging optical system according to claim 1, wherein the imaging optical system includes at least one or more aspheric surfaces in the fourth lens group, and is configured to satisfy the following conditional expression (4):

$$0 < f/|f4| < 0.30 \tag{4}$$

where a focal distance of an entire system is f, and a focal distance of the fourth lens group is f4.

6. The imaging optical system according to claim 1, wherein the imaging optical system is configured to satisfy the following conditional expression (5):

$$0.70 < TL/f < 1.10 \tag{5}$$

where a distance on the optical axis from a forefront surface of the first lens group to a backmost surface of the fourth lens group when focusing on infinity is TL, and a focal distance of an entire system is f.

7. The imaging optical system according to claim 1, wherein the imaging optical system is configured to satisfy the conditional expression (6):

$$1.00 < |AP/Rg41| < 2.50 \tag{6}$$

where the distance on the optical axis from the image plane to the exit pupil position in the imaging optical system is AP, and a curvature radius of a forefront surface of the fourth lens group is Rg41.

8. A camera device comprising the imaging optical system according to claim 1.

9. The camera device according to claim 8 comprising a function for converting a photographic image into digital information.

10. A mobile information terminal device comprising the imaging optical system according to claim 1.

* * * * *